United States Patent
Alley et al.

(10) Patent No.: US 9,940,285 B2
(45) Date of Patent: Apr. 10, 2018

(54) CONFIGURABLE IO-CHANNEL SYSTEM WITH EMBEDDED MICROCONTROLLER

(71) Applicant: General Electric Company, Schenectady, NY (US)

(72) Inventors: Daniel Milton Alley, Salem, VA (US); Alan Carroll Lovell, Salem, VA (US)

(73) Assignee: General Electric Company, Schenectady, NY (US)

( * ) Notice: Subject to any disclaimer, the term of this patent is extended or adjusted under 35 U.S.C. 154(b) by 194 days.

(21) Appl. No.: 14/947,811

(22) Filed: Nov. 20, 2015

(65) Prior Publication Data

US 2017/0147367 A1    May 25, 2017

(51) Int. Cl.
| | |
|---|---|
| G06F 13/40 | (2006.01) |
| G05B 19/00 | (2006.01) |
| G06F 13/42 | (2006.01) |
| G05B 19/042 | (2006.01) |
| G05B 19/05 | (2006.01) |

(52) U.S. Cl.
CPC ..... *G06F 13/4027* (2013.01); *G05B 19/0423* (2013.01); *G05B 19/054* (2013.01); *G06F 13/4221* (2013.01); *G05B 2219/11* (2013.01); *G05B 2219/1105* (2013.01); *G05B 2219/1131* (2013.01); *G05B 2219/1138* (2013.01)

(58) Field of Classification Search
CPC .............. G05B 19/0423; G05B 19/054; G05B 2219/11; G05B 2219/1105; G05B 2219/1131; G05B 2219/1136; G05B 2219/1138

See application file for complete search history.

(56) References Cited

U.S. PATENT DOCUMENTS

| | | | |
|---|---|---|---|
| 4,910,659 A | 3/1990 | Gates et al. | |
| 7,412,548 B2 * | 8/2008 | Sichner ................ | G05B 19/054 710/10 |
| 7,822,896 B1 * | 10/2010 | Sagues ................ | G05B 19/054 710/104 |
| 7,912,562 B2 | 3/2011 | Dute | |
| 8,073,991 B2 | 12/2011 | Alley et al. | |
| 8,290,030 B2 | 10/2012 | Golborne et al. | |
| 8,373,586 B2 | 2/2013 | Alley et al. | |
| 8,463,963 B2 | 6/2013 | Komiyama et al. | |

(Continued)

OTHER PUBLICATIONS

Xiao-Ming, Design of Multi-Channels HART Protocol Conversion and Intelligent I/O Module Based on SOPC, Power System Technology, 2008.

(Continued)

*Primary Examiner* — Glenn A Auve
(74) *Attorney, Agent, or Firm* — Armstrong Teasdale LLP

(57) ABSTRACT

The present technology provides for an IO module system (e.g., an industrial control system) that can provide multiple-channel analog and digital interfaces to a number of sensor devices of different types, where each channel of the IO module is programmably configurable as a digital input, a digital output, an analog input, and an analog output. Each sensor interface is implemented on an individual channel basis using discrete components in communication with a microcontroller. The present technology enables the rapid implementation of an IO channel operable in a wide range of voltage and current modes needed for common sensor interfaces.

19 Claims, 16 Drawing Sheets

(56) References Cited

U.S. PATENT DOCUMENTS

| | | |
|---|---|---|
| 8,806,085 B2 | 8/2014 | Mathason et al. |
| 8,924,600 B2 | 12/2014 | Alley et al. |
| 2013/0188752 A1 | 7/2013 | Sin |
| 2014/0047137 A1 | 2/2014 | Mathason et al. |
| 2014/0239923 A1 | 8/2014 | Alley |
| 2016/0139580 A1* | 5/2016 | Hashiguchi ........ G05B 19/0423 700/12 |

OTHER PUBLICATIONS

Guochen, Design of Intelligent Transmitter Based on HART Protocol, ICICTA, 2010, vol. 2, pp. 40-43.

* cited by examiner

CONFIGURABLE IO-CHANNEL SYSTEM WITH EMBEDDED MICROCONTROLLER

BACKGROUND

Embedded control systems ("control systems") can be used in a wide variety of different applications. For example, control systems can be used to control and monitor power stations, turbines, and the like. In relatively complex control systems, it is typically necessary to monitor or sense a variety of different types of input signals such as thermocouple inputs, resistance temperature detectors (RTDs), currents, voltages, capacitances, inductances, and resistances.

One type of control system employs configurable input-output (IO) channels, also referred to as universal IO channels, to serve as the digital and analog interfaces to sensors for a number of different types of applications as well as the different configurations of a given application type. This type of control system enables a modular and scalable design approach of the controls for a number of applications, whereby the same configurable IO channel design are used for any sensor interface, and the configurable IO channels are then configured for the specific application during the manufacturing, assembly, or commissioning of the control systems.

Because of the high degree of electrical interferences (e.g., EMI) often present in large scale industrial applications, as well as the need for the inputs and outputs of the control system to operate across a wide range of sensor interfacing modes, conventional techniques associated with large scale production and fabrication of configurable IO channels, or controller thereof, fully integrated on a single mixed-signal die may require an undue amount of design time.

Therefore, what are needed are devices, systems and methods that overcome challenges in the present art, some of which are described above.

SUMMARY

The present technology enables an IO module system (e.g., an industrial control system) that provides multiple-channel analog and digital interfaces to a number of sensor devices of different types, where each channel of the IO module is programmably configurable as a digital input, a digital output, an analog input, and an analog output. In illustrative embodiments herein, the Universal I/O provides analog and digital interfaces for voltage input (including thermocouples), current loop input (including floating and grounded input references), RTD sensing, current loop output source, voltage output, among others. Each sensor interface is implemented on an individual channel basis using discrete components in communication with a microcontroller (e.g., a commercially-available, off-the-shelf microcontroller). To this end, the present technology enables the rapid implementation of an IO channel module operable at a wide range of voltage and current modes needed for common sensor interfaces. The IO module preferably uses built-in peripheral IO components of a microcontroller as part of the primary IO interface for a number of sensors.

The present disclosure further provides, in some embodiments, an IO module that provides universal input and output interface via two electrical terminals. The IO module beneficially simplifies the wiring of sensor components to each respective IO channel, which may substantially reduce the cost of installation of the IO module within the control system.

In an aspect, a system for use in an industrial control system and connectable to a programmable logic controller (PLC) is described. The system includes a processor (e.g., a system controller) and configurable input-output (IO) channels (e.g., two or more channels), wherein each configurable input-output (IO) channel is operatively coupled to the processor to provide analog and digital interfaces to one of a number of device types (e.g., various sensor types), wherein the analog and digital interfaces are configurable as digital inputs, digital outputs, analog inputs, and analog output based on control signals outputted between the processor and a given configurable IO channel. The various device types may include, but not limited to, a grounded or floating current source or sink, a single-ended or differential voltage source or sink, a thermocouple, a resistance temperature detector (RTD), a sensor, and a communication device. Each configurable IO channel includes a microcontroller operatively coupled to an IO switching unit (e.g., a second discrete component), wherein the IO switching unit is configurable to direct IO signals from one or more terminals of the configurable IO channel to an IO peripheral unit of the microcontroller. The microcontroller is preferably fabricated on a first die, and the IO switching unit is preferably fabricated on a second die, different from the first die. That is, the IO switching unit and the microcontroller are distinct components, separate from one another. In some embodiments, a die is a semiconductor material on which a functional circuit is fabricated and may be packaged in a single or a multi-part package.

In some embodiments, the microcontroller includes an integrated circuit having a processor unit, a memory unit, and the IO peripheral unit, collectively integrated on either a single die or within a core embedded within a field programmable gate array (FPGA) or an application-specific integrated circuit (ASIC). In some embodiments, the microcontroller includes a general-purpose microcontroller (e.g., a discrete, off-the-shelf component). In some embodiments, each configurable IO channel includes two terminal posts, each configured to provide a discrete electrical connection to a connected device of the plurality of device types. In some embodiments, the IO switching unit are configurable to direct IO signals from one or more terminals of each configurable IO channel to an IO peripheral unit of the microcontroller. In some embodiments, the IO switching unit is configurable to direct IO signals from one or more terminals of each configurable IO channel to a resistive network, wherein the resistive network has a plurality of states, each state being selectable by the IO switching unit. In some embodiments, the IO switching unit is configured to direct IO signals to one or more IO ports of the IO peripheral unit of the microcontroller, wherein the IO ports is a general-purpose IO (GPIO), a Universal Asynchronous Receiver/Transmitter (UART) interface, a Serial Peripheral Interface (SPI) bus interface, an Inter-Integrated Circuit (I2C) bus interface, or a Controller Area Network (CAN) bus interface.

In some embodiments, the plurality of configurable IO channels (e.g., 2 or more, such as 2, 3, 4, 5, 6, 7, or 8) are grouped into one or more IO groups. In some embodiments, the grouping includes a first IO group and a second IO group. In some embodiments, the first IO group is electrically isolated from the second IO group.

In some embodiments, each IO groups includes a pair of configurable IO channels including a first IO channel and a second channel and a pairing switch unit coupled therebetween so as to allow simultaneous connection to a device (e.g., an external sensor). The pairing switch unit, in some embodiments, is configurable based on control signals from the microcontroller.

In some embodiments, the system includes an output conditioning circuit, wherein the output conditioning circuit includes, but not be limited to, a digital-to-analog converter (DAC) circuit coupled to a digital output IO of the IO peripheral unit of the microcontroller. In some embodiments, the digital output IO includes a type selected from the group consisting of a general-purpose IO, a Universal Asynchronous Receiver/Transmitter (UART) interface, a Serial Peripheral Interface (SPI) bus interface, an Inter-Integrated Circuit (I2C) bus interface, and a Controller Area Network (CAN) bus interface.

In some embodiments, the analog and digital input conditioning circuit includes a programmable gain amplifier (PGA) circuit having a plurality of configuration states, wherein each configuration state of the PGA is selectable based on control signals associated with the digital output IO of the IO peripheral unit of the microcontroller. In some embodiments, the digital output IO includes a general-purpose IO (GPIO), a Universal Asynchronous Receiver/Transmitter (UART) interface, a Serial Peripheral Interface (SPI) bus interface, an Inter-Integrated Circuit (I2C) bus interface, and a Controller Area Network (CAN) bus interface.

In some embodiments, the analog and digital input conditioning circuit includes a programmable gain amplifier (PGA) circuit operatively coupled to an analog input IO of the IO peripheral unit of the microcontroller. The analog and digital input conditioning circuit, in some embodiments, includes a programmable gain amplifier (PGA) circuit operatively coupled to a digital input IO of the IO peripheral unit of the microcontroller.

In some embodiments, each configurable IO channel includes a modem device interface. The modem device interface is configured as a Highway Addressable Remote Transducer (HART) interface.

In some embodiments, each configurable IO channel includes an output conditioning circuit, wherein the output conditioning circuit includes a low-pass filter circuit and a current driver. The low-pass filter circuit and current driver are, in some embodiments, collectively coupled to a digital output IO of the IO peripheral unit of the microcontroller. The digital output IO, in some embodiments, includes a type selected from the group consisting of a timer IO and a pulse-width modulation (PWM) IO. In some embodiments, the digital output IO includes a GPIO, SPI, and I2C port configured to output sigma-delta encoded signals.

In another aspect, a universal IO channel, configurable to provide analog and digital interfaces to a plurality of device types of different types, is disclosed, wherein the analog and digital interfaces are configurable as either a digital input, a digital output, an analog input, or an analog output. The universal IO channel preferably includes a microcontroller, having an integrated circuit having a processor unit, a memory unit, and a programmable IO peripheral unit, collectively integrated on a single die. The universal IO channel further includes an IO switching unit operatively coupled to the microcontroller, where the IO switching unit is configurable to direct IO signals from one or more terminals of the configurable IO channel to the IO peripheral unit of the microcontroller. The IO switching unit is preferably fabricated on a second die different from the first die. Among other things, the design of the IO switching unit on a different die than that of the microcontroller allows for discrete components to be used that are faster and easier, for certain applications, to integrate on a printed circuit board.

In some embodiments, the microcontroller (e.g., a discrete, off-the-shelf component) includes an integrated circuit having a processor unit, a memory unit, and the IO peripheral unit, collectively integrated on either a single die or within a core embedded within a field programmable gate array (FPGA) or an application-specific integrated circuit (ASIC).

In some embodiments, each configurable IO channel includes two terminal posts, each configured to provide a discrete electrical connection to a connected device of the plurality of device types. The two terminal posts beneficially simplify wiring of sensor components to each respective IO channel. In some embodiments, the IO switching unit are configurable to direct IO signals from one or more terminals of each configurable IO channel to an IO peripheral unit of the microcontroller. In some embodiments, the IO switching unit is configurable to direct IO signals from one or more terminals of each configurable IO channel to a resistive network, wherein the resistive network has a plurality of states, each state being selectable by the IO switching unit. In some embodiments, the IO switching unit is configured to direct IO signals to one or more IO ports of the IO peripheral unit of the microcontroller, wherein the IO ports of the microcontroller used to interface with the discrete components, in some embodiments, include general-purpose IO (GPIO), a Universal Asynchronous Receiver/Transmitter (UART) interface, a Serial Peripheral Interface (SPI) bus interface, an Inter-Integrated Circuit (I2C) bus interface, and a Controller Area Network (CAN) bus interface.

In some embodiments, the plurality of configurable IO channels are partitioned into one or more IO groups, including a first IO group and a second IO group. The first IO group are electrically isolated, in some embodiments, from the second IO group. In some embodiments, at least one of IO groups includes a pair of configurable IO channels. In some embodiments, the pair of configurable IO channels includes a first IO channel and a second channel. In some embodiments, the pair of configurable IO channels includes a pairing switch unit coupled between the first IO channel and the second IO channel. In some embodiments, the paired configurable IO channels is configurable to simultaneously connect to a device (e.g., a sensor). The pairing switch unit, in some embodiments, are configurable based on control signals from the microcontroller.

In some embodiments, the system includes an output conditioning circuit, wherein the output conditioning circuit includes, but not be limited to, a digital-to-analog converter (DAC) circuit coupled to a digital output IO of the IO peripheral unit of the microcontroller. In some embodiments the digital output IO includes a type selected from the group consisting of a general-purpose IO, a Universal Asynchronous Receiver/Transmitter (UART) interface, a Serial Peripheral Interface (SPI) bus interface, an Inter-Integrated Circuit (I2C) bus interface, and a Controller Area Network (CAN) bus interface.

In some embodiments, the analog and digital input conditioning circuit includes a programmable gain amplifier (PGA) circuit having a plurality of configuration states, wherein each configuration state of the PGA is selectable based on control signals associated with the digital output IO of the IO peripheral unit of the microcontroller. In some embodiments, the digital output IO includes a general-purpose IO (GPIO), a Universal Asynchronous Receiver/Transmitter (UART) interface, a Serial Peripheral Interface (SPI) bus interface, an Inter-Integrated Circuit (I2C) bus interface, and a Controller Area Network (CAN) bus interface.

In some embodiments, the analog and digital input conditioning circuit includes a programmable gain amplifier (PGA) circuit operatively coupled to an analog input IO of the IO peripheral unit of the microcontroller. The analog and digital input conditioning circuit, in some embodiments, includes a programmable gain amplifier (PGA) circuit operatively coupled to a digital input IO of the IO peripheral unit of the microcontroller.

In some embodiments, each configurable IO channel includes a modem device interface. The modem device interface may be configured as a Highway Addressable Remote Transducer (HART) interface.

In some embodiments, each configurable IO channel includes an output conditioning circuit, wherein the output conditioning circuit includes a low-pass filter circuit and a current driver. The low-pass filter circuit and current driver are, in some embodiments, collectively coupled to a digital output IO of the IO peripheral unit of the microcontroller. The digital output IO, in some embodiments, includes a type selected from the group consisting of a timer IO and a pulse-width modulation (PWM) IO.

In another aspect, a method for interfacing to a plurality of device types of different types (e.g., different sensor types) is disclosed. The method includes receiving, by a microcontroller, a first configuration signal from a processor of a control system controller. The microcontroller are operatively coupled to a plurality of switch components and a plurality of peripheral components wherein each of the switch and peripheral components have a plurality of states. The switches and peripheral components form one of a plurality of signal paths between a terminal (e.g., a sensor terminal) and a peripheral IO unit of the microcontroller wherein each signal path is associated with a sensor type mode. The method further includes determining, by the microcontroller, a set of states of the plurality of switch components and the plurality of peripheral components based on the first configuration signals. The method further includes, transmitting, in response to the determination, second configuration signals to the plurality of switch components and the plurality of peripheral components according to the determined set of states. The method further includes receiving, along the signal path, at the peripheral IO unit of the microcontroller, interface signals corresponding to input or output signals received at the terminal.

In some embodiments, the microcontroller includes an integrated circuit having a processor unit, a memory unit, and the IO peripheral unit, collectively integrated on either a single die or within a core embedded within a field programmable gate array (FPGA) or an application-specific integrated circuit (ASIC). In some embodiments, the microcontroller includes a general-purpose microcontroller (e.g., a discrete, off-the-shelf component).

In some embodiments, the method further includes connecting a wiring of a given sensor to only two terminal posts associated with a given IO channel.

In some embodiments, the method include grouping two or more configurable IO channels into a functional group to simultaneously connect to sensor input having more than two wires. In some embodiments, the sensor is a 3-wire RTD or a 4-wire RTD. The grouping may be enabled by actuating a switch unit in communication between a first IO channel and a second IO channel of the two or more IO channels.

In some embodiments, the method includes outputting a signal from a digital output IO of the IO peripheral unit of the microcontroller to a digital-to-analog converter (DAC) circuit to provide an output conditioned signal as an analog or digital output interface for a sensor. In some embodiments, the digital output IO is a general-purpose IO, a Universal Asynchronous Receiver/Transmitter (UART) interface, a Serial Peripheral Interface (SPI) bus interface, an Inter-Integrated Circuit (I2C) bus interface, or a Controller Area Network (CAN) bus interface.

In some embodiments, the method includes receiving a signal at a digital or analog input of the IO peripheral unit of the microcontroller from a programmable gain amplifier (PGA) circuit having a plurality of configuration states, wherein each configuration state of the PGA is selectable based on control signals associated with the digital output IO of the IO peripheral unit of the microcontroller. In some embodiments, the analog and digital input conditioning circuit includes a programmable gain amplifier (PGA) circuit operatively coupled to an analog input IO of the IO peripheral unit of the microcontroller. In some embodiments, the analog and digital input conditioning circuit includes a programmable gain amplifier (PGA) circuit operatively coupled to a digital input IO of the IO peripheral unit of the microcontroller. In some embodiments, the digital output IO includes a general-purpose IO (GPIO), a Universal Asynchronous Receiver/Transmitter (UART) interface, a Serial Peripheral Interface (SPI) bus interface, an Inter-Integrated Circuit (I2C) bus interface, and a Controller Area Network (CAN) bus interface. In some embodiments, each configurable IO channel includes a modem device interface. The modem device interface is configurable as a Highway Addressable Remote Transducer (HART) interface.

In some embodiments, the method includes outputting a signal from a digital output IO of the IO peripheral unit of the microcontroller to a low-pass filter circuit and a current driver to provide an analog output interface for the IO channel. The digital output IO, in some embodiments, is a timer IO or a pulse-width modulation (PWM) IO.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the Examples included therein and to the Figures and their previous and following description.

Figure 1:
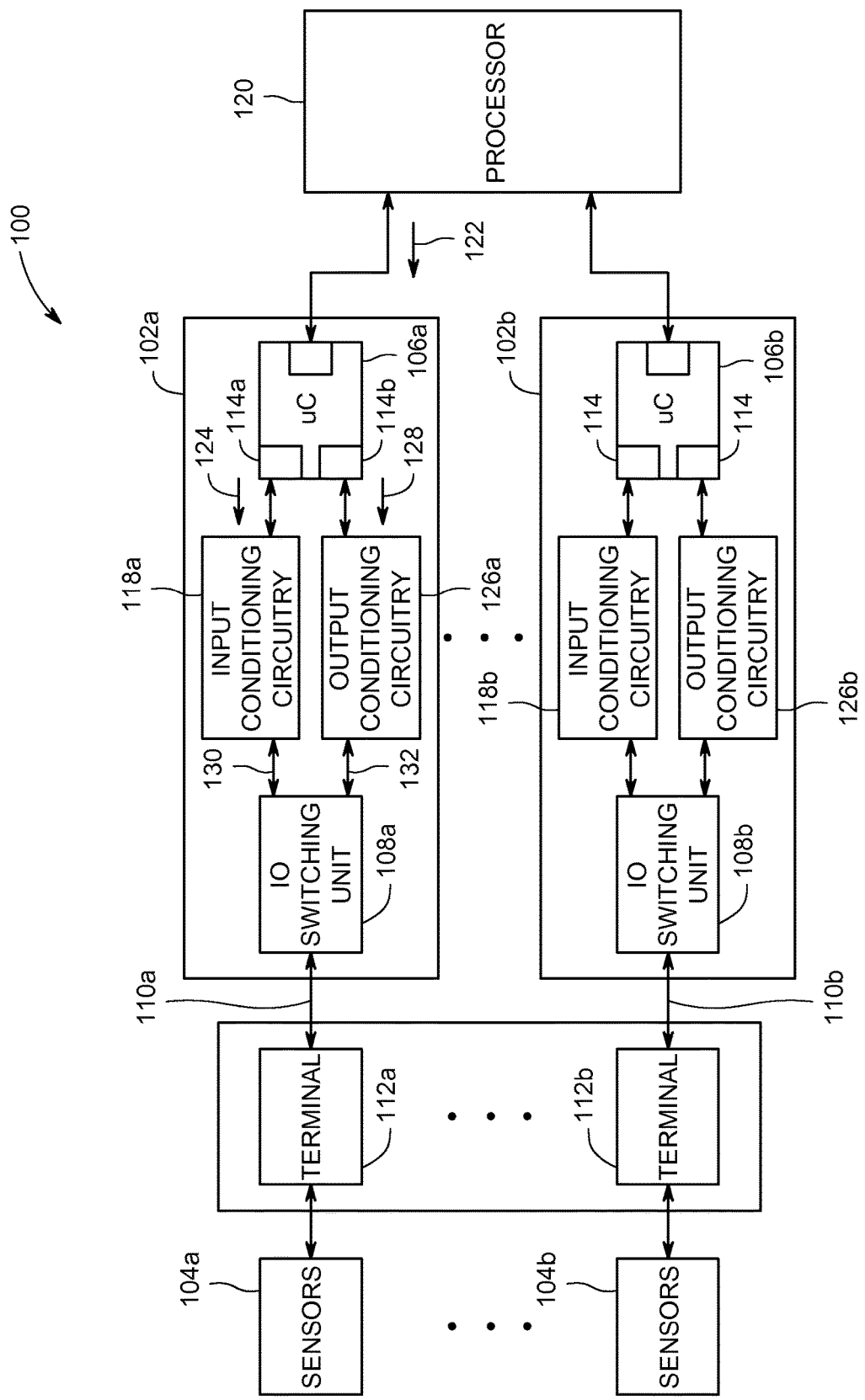
FIG. 1 depicts a diagram of a system having a number of configurable IO channels (e.g., two or more channels) to provide universal analog and digital interfaces to a number of device types in accordance with an illustrative embodiment. Each configurable IO channel, or a group thereof, includes one or more microcontrollers or microcontroller cores fabricated on a first die. Within each channel, the one or more microcontrollers are connected to one or more IO switching units, which include discrete components fabricated on a second die. The IO switch units are configurable to direct IO signals from one or more terminals of each respective IO channel to the microcontroller.

FIG. 1 depicts a diagram of a system 100 (e.g., a universal IO module) having a number of configurable IO channels 102 (e.g., two or more channels) to provide universal analog and digital interfaces to a number of device types 104 in accordance with an illustrative embodiment. The IO channel may be configurable to receive or transmit one of a thermocouple IO, a RTD IO, a current IO (or current loop IO), or a voltage IO.

Each configurable IO channel 102 (shown as 102a and 102b), or a group thereof, includes one or more microcontrollers 106 (shown as 106a and 106b) or microcontroller cores fabricated on a first die. Within each channel, the one or more microcontrollers 106 are connected to one or more IO switching units 108 (shown as 108a and 108b), which include discrete switching and/or gating components fabricated on a second die. In some embodiments, a die is semiconductor material on which a functional circuit is fabricated and may be packaged in a single or a multi-part package. Each IO switching unit 108 is configurable to direct IO signals 110 (shown as 110a and 110b) from one or more terminals 112 (shown as 112a and 112b) of each IO channel 102a, 102b to each respective microcontroller 106a, 106b. The IO module may be used to universally connect to sensors for a number of platforms, for example, within power plant controls, turbine controls, substation controls, industrial automation controls, and/or building automation controls.

A "microcontroller" (sometimes abbreviated μC, uC or MCU) refers to a small computer on a single integrated circuit containing a processor core, memory, and programmable input/output peripherals. Among other things, program memory in the form of Ferroelectric random-access memory (RAM), NOR flash or one-time programmable read-only memory (OTP ROM) may be included on chip. Examples of programmable input/output peripherals of the microcontrollers include digital IOs such as General-purpose input/output (GPIO), universal asynchronous receiver/transmitter (UART) IOs, Serial Peripheral Interface (SPI) IO, and Inter-Integrated Circuit (I2C) IO, as well as analog IO such as analog-to-digital converter (ADC). The microcontroller may be a separate part or a "core" within a field-programmable gate array (FPGA) chip or other logic device (e.g. digital ASIC) chip.

As shown in FIG. 1, in each IO channel 102, the respective microcontroller 106 of the channel interfaces with a processor 120 which provides commands 122 to the microcontroller 106 to facilitate, or trigger, configuration of the IO channel 102. The processor 120 controls the configuration of the various IO channels to select IO signal types associated with the IO channels. As one example, the processor 120 provides respective channel mode signals to the various switching components of the IO channels 102 to configure the IO channel 102 to interface to a particular IO signal type (e.g., a voltage, thermocouple, current, or RTD IO).

In addition to configuring the IO module 100, the processor 120 may include a number of processor-driven devices that control the operations of the IO circuit. In some embodiments, the operations of the processor 120 is controlled by computer-executed or computer-implemented instructions that can be executed by the processor. In operation, the processor 120 may control the scanning of the IO channels 102, the receipt from one or more ADC components of analog measurements data associated with the IO channels 102, the processing of the received analog measurements data, and/or the output of measurements data and/or other messages to one or more external devices. Once one or more IO channels 102 have been configured, the processor 120 may communicate a channel select signal to the multiplexing component in order to select channel signals for provision to the ADC and/or DAC component(s). In this regard, the processor 120 may selectively scan various IO channels 102 (e.g., scan in a loop or scan according to an algorithm) in order to receive or transmit measurements data associated with the IO channels 102. The processor 120 may control the gain of a PGA utilizing a channel gain signal.

In some embodiments, the processor is a global controller that is external to the system 100, for example, residing on a programmable logic controller (PLC), a supervisory control and data acquisition system (SCADA), a programmable automation controller (PAC), a human-man interface (HMI) automation controller, or other type of controllers that interfaces the system 100 (e.g., as the universal IO module). The system 100 may include data isolation circuitries for the microcontrollers 106 to interface to the processor 120. In some embodiments, the microcontrollers 106 communicate, via UART, SPI, I2C, or GPIO ports, with the processor 120.

Figure 2:
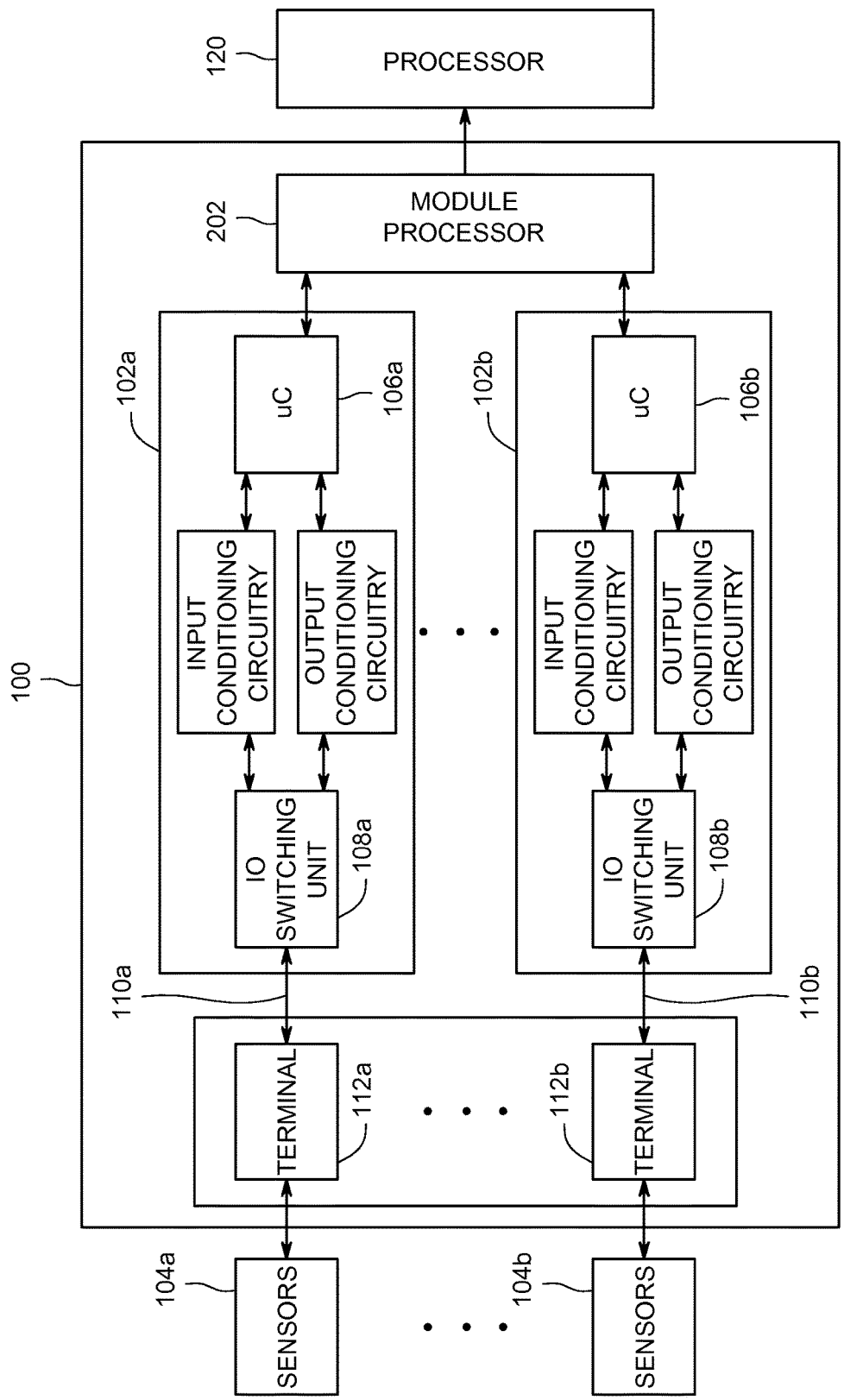
FIG. 2 depicts a diagram of the system 100 configured with a local processor in accordance with another illustrative embodiment.

In some embodiments, the system includes a local processor. FIG. 2 depicts a diagram of the system 100 configured with a local processor 202 (shown as "module processor 202") in accordance with another embodiment. The processor 202 may interface to one or more external processors 102 corresponding to a programmable logic controller (PLC), a supervisory control and data acquisition system (SCADA), a programmable automation controller (PAC), a HMI automation controller, or other types of controllers. In some embodiments, the processor 202 interfaces to the external processors 102 via a communication interface of the IO module 100.

Figure 3:
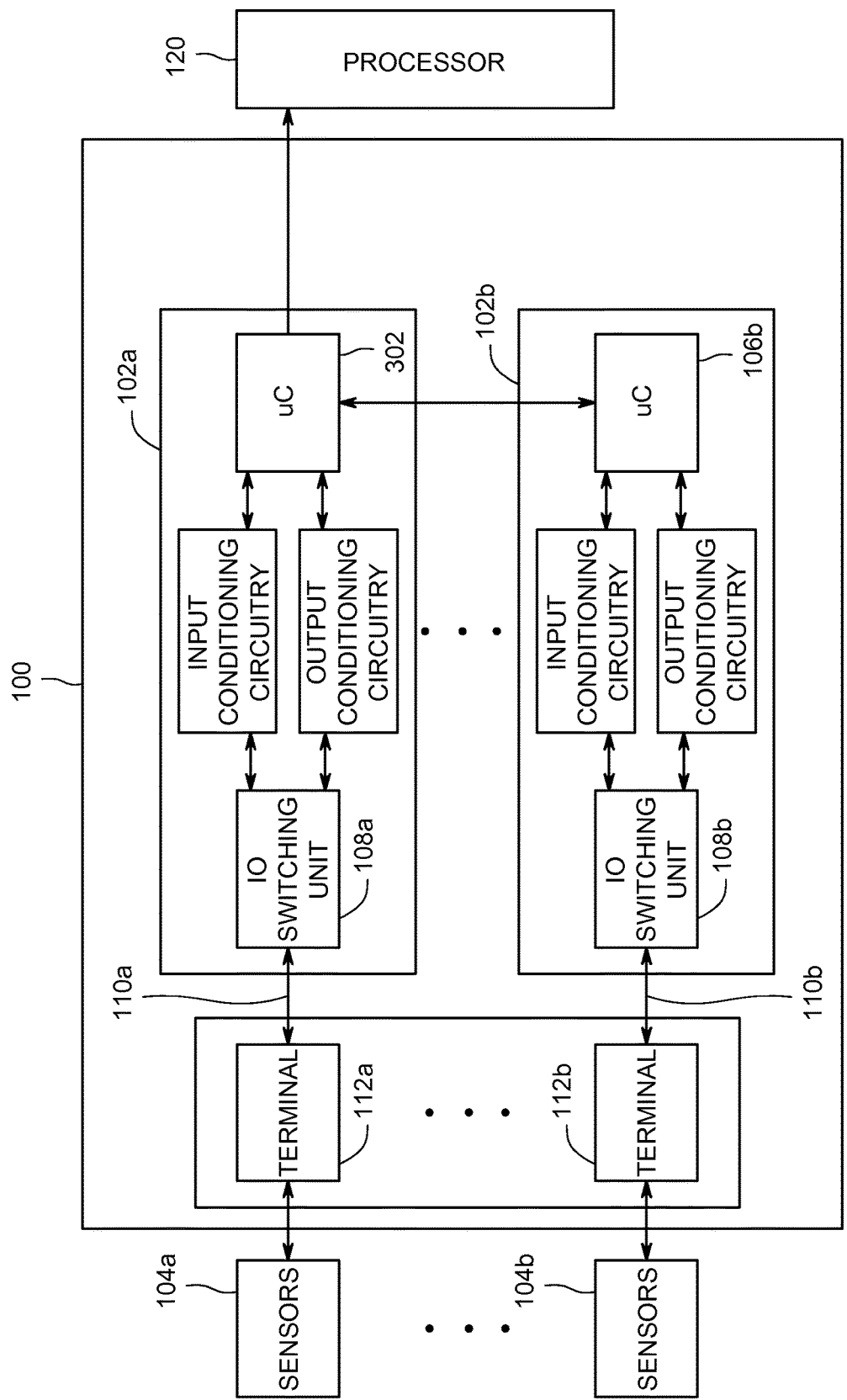
FIG. 3 depicts a diagram of the system configured with a master microcontroller in accordance with another illustrative embodiment.

In some embodiments, one microcontroller 106 of one of the IO channel 102 serves as a central interface (e.g., as a master microcontroller) to the external processor 120. FIG. 3 depicts a diagram of the system 100 configured with a master microcontroller in accordance with another embodiment. The master microcontroller 302 may interface to each individual microcontrollers 106 of the various channels 102 in a parallel manner. In other embodiments, the master microcontrollers are linked to other individual microcontrollers 106 of the various channels in a serial manner, e.g., in a daisy chain. In some embodiments, each microcontroller channel includes data isolation circuitries to interface to microcontrollers of nearby channels.

Referring back to FIG. 1, the processor 120 receives commands and/or configuration information (e.g., from an interface associated with an end-user, from a loading of a configuration file, or a reading of non-volatile memory) associated with configuration states of the IO module 100 and provides a signal 122 associated with the configuration state to the microcontroller 106 of each of the IO channels 102. An example of a configuration state includes a designation of a given IO channel as a digital input, a digital output, an analog output, an analog input, and a communication interface. In some embodiments, signals 122 include a command associated with a voltage mode operation or a current mode operation. Examples of voltage modes of operation include, but not limited to, differential voltage input or single-ended voltage input configuration, voltage type (e.g., AC or DC) configuration, as well as a voltage range configuration such as 3.3V, 5V, 12V, 15V, 24VDC, 48V, 115V, 120V among others. Examples of current modes of operation include, but not limited to, 4 mA-24 mA and/or grounding modes (e.g., floating ground or shared ground path). In some embodiments, the signals 122 include an identification number associated with a configuration type—such as "5V differential", "+/−5VDC", or "120VAC". In some embodiments, the signals 122 include commands to actuate individual switching or gating components to which the microcontroller is attached. In some embodiments, the signal 122 includes a sensor type identifier type, such a resistance temperature or thermocouple device or a communication protocol such as HART protocol, controller area network protocol, Ethernet protocol, DeviceNet protocol, Modbus protocol, GE SRTP protocol, Honeywell SDS protocol, among others.

In each IO channel 102, the microcontroller 106 interfaces with an analog/digital input conditioning circuitry 118 to condition an input signal 130 from the IO switching unit 108 to an operating range and/or mode that is usable by a first set of peripheral IOs 114a of the microcontroller 106. In some embodiments, the analog/digital input conditioning circuit 118 includes a multiplexer coupled to a programmable gate array. The analog/digital input conditioning circuitry 118 receives inputs 124 from the microcontroller 106 to set configuration of a multiplexer and a programmable gate array (PGA) to provide configurable current and voltage inputs to the microcontroller 106. In some embodiments, the multiplexer is coupled to the IO switching block, and the programmable gate array is interfaced to a GPIO, SPI, or I2C peripheral port 114 of the microcontroller 106.

In each IO channel 102, the microcontroller 106 interfaces with an analog/digital output conditioning circuitry 126 to condition an output signal 132 connected to a second set of peripheral IOs 114b of the microcontroller 106 to an operating range or mode that is useable for interfacing to the device 104. In some embodiments, the analog/digital output conditioning circuitry 126 includes a digital-to-analog converter (DAC) circuit to provide configurable current and voltage outputs. The analog/digital output conditioning circuitry 126 (shown as 126a and 126b) receives signals 128 from the microcontroller 106 to set the operating range and/or mode. In some embodiments, the digital-to-analog converter (DAC) circuit is in communication with the IO switching unit 108 and the peripheral IO 114b of the microcontroller 106. The DAC circuit may interface to a GPIO, SPI, or I2C port of the microcontroller 106.

Example DACs that may be used include, but not limited to, DAC8760, manufactured by Texas Instrument Inc., and AD5755-1, manufactured by Analog Devices Inc. The AD5755-1 DAC includes a quad channel DAC with both mA and voltage outputs and HART modulation inputs.

As shown in FIG. 1, in each IO channel 102, the IO switching unit 108 communicates with the analog/digital input conditioning circuitry 118 and analog/digital output conditioning circuitry 126. The IO switching unit 108 may include a number of switches that may be selectively actuated to select an IO signal type. The microprocessor 106 may provide a channel mode signal to the IO switching unit 108 to actuate one or more switches of the IO switching unit 108 to select an IO signal type. Exemplary modes of operation are provided in Table 1, which is provided as a non-exhaustive non-limiting example.

TABLE 1

Operation Modes

Externally-powered switching
Non-powered switching
Floating current input
Current input to ground
Current output
Thermocouple interface
Single-ended voltage input
Differential voltage input
Voltage output
RTD interface The IO switching unit 108 may additionally receive or transmit one or more reference signals, such as a voltage reference signal (e.g., an approximately 24 VDC reference signal, and the like) and/or one or more RTD current source signals received or transmitted from one or more RTD current sources. At least one RTD current setting signal may be provided to the RTD current source(s) by the microcontroller in order to configure the RTD current source signals that are provided to the switching component.

Figure 4:
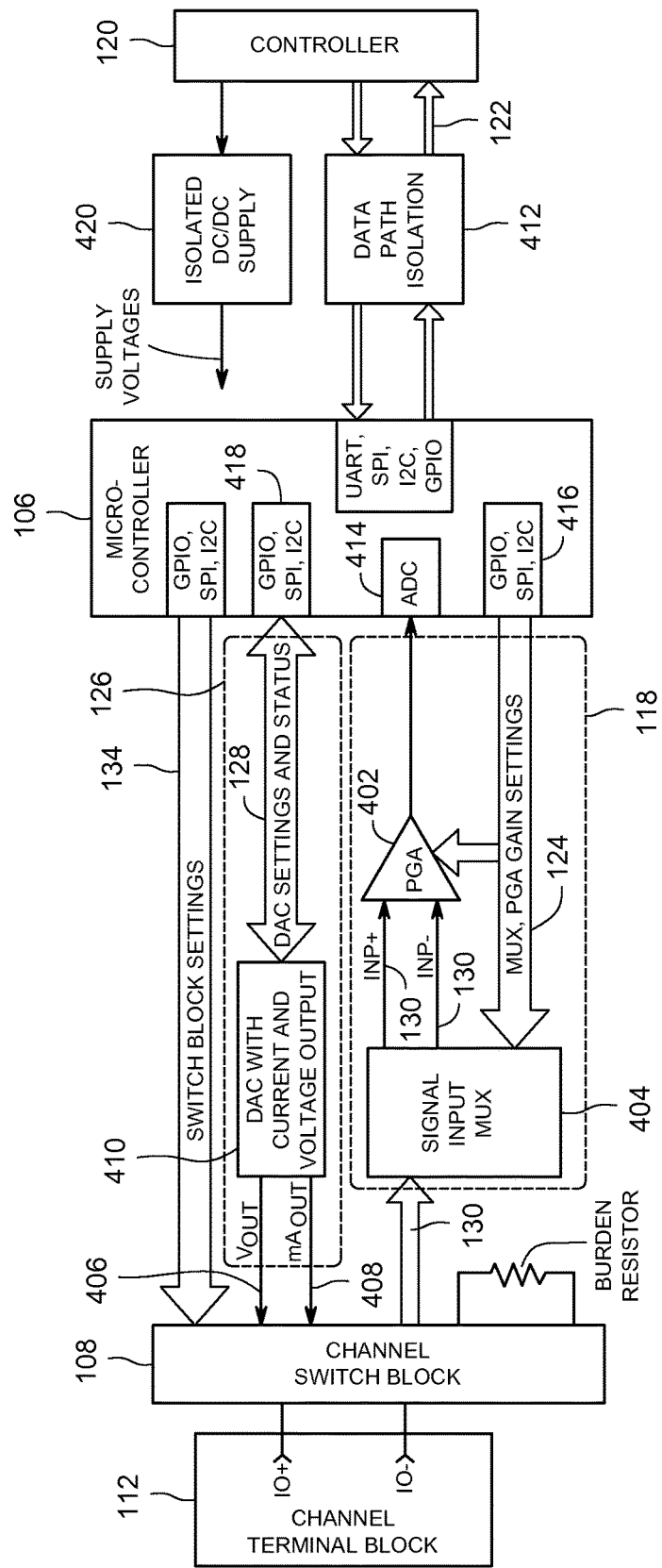
FIG. 4 depicts a diagram of an IO channel of the universal IO module of FIG. 1, the IO module being configured to provide selectable and configurable analog input, analog output, digital input, and digital output for a number of device types in accordance with an illustrative embodiment.

FIG. 4 depicts a block diagram of exemplary analog/digital input conditioning circuitry 118 and analog/digital output conditioning circuitry 126 in accordance with an embodiment. The analog/digital input conditioning circuitry 118 includes a programmable gain amplifier (PGA) 402 and a signal input multiplexer 404. The input conditioning circuitry 118 is programmably connected to the channel switch block 108 through the signal input multiplexer 404. The signal input multiplexer 404 receives, in some embodiments, inputs 124, from a general IO port, a SPI port, or an I2C port 416 of the IO peripheral ports 114 of the microcontroller 106, to select one of a number of analog or digital input signals from the channel switch block 108. For example, the signal input multiplexer 404 may select signal lines corresponding to single-end, differential-ended operation and as well grounding modes. The selected analog and digital input signals 130 is received at the programmable gain amplifier 402, which adjusts the levels of the input signals 130. The programmable gain amplifier 402 provides the adjusted input signals 130 to an analog-to-digital port 414 of the peripheral input-output port 114 of the microcontroller 106.

Referring still to FIG. 4, the analog/digital output conditioning circuitry 126 includes a digital-to-analog converter (DAC) 410 configurable to output either current or voltage. The DAC circuit 410 of the output conditioning circuitry 126 receives from the microcontroller 106, configurable signals 128 associated with the setting of output levels. The output conditioning circuitry 126 may provide status and feedback inputs to the controller 106. The output conditioning circuitry 126 is configured to receive, in some embodiments, a digital signal from the general purpose IO port, the SPI port, or the I2C port 418 of the peripheral ports 114 of the microcontroller 106 and convert the digital signal into a desired voltage output 406 and current output 408.

In some embodiments, each IO channel 102 provides the input and output interface to the external device 104 via two terminal pins at the terminal block 112. That is, rather than having individual set of pins for each analog and digital operation or for each input and output operation, the IO channel 102 uses the same terminal pins for analog input, analog output, digital input, and digital output operations. Because each IO channel has only two pins, the technology greatly simplifies the operation of wiring the IO module 100 to the various sensors 104 for a given application.

In some embodiments, the IO channel 102 is configured to operate in conjunction with a second IO channel 102 to receive inputs from devices having more than two pins (e.g., certain RTD devices). This structure keeps the two connections of the terminal pins for each IO channel 102 and leverages a "sister channel," for example, for RTD operation. In some embodiments, the IO module 100 includes pre-defined sets of paired IO channels. In other embodiment, paired IO channels are selectable for any two nearby IO channels of the IO module 100.

In some embodiments, the wiring is reversible, such as for certain current output and input operations.

Referring still to FIG. 4, each channel 102 of the IO system 100 may include one or more isolation circuitries 412 for the IO peripheral port 114 of the microcontroller 106 to interface to the processor 120 (shown as "controller 120"). A digital isolation barrier may provide galvanic and/or electrical isolation for the input channels from other components of the IO circuit. A wide variety of different types of isolation barriers may be used in various aspects of the disclosure, including but not limited to, optically coupled devices, inductively coupled devices, radio frequency coupled devices, capacitance coupled devices, and/or buffer circuits.

The IO channel 102 may include a protection component which includes suitable circuitry and/or other devices (e.g., diodes, transorbs, and the like) that facilitate the protection of other components of the IO channel, such as components downstream of the IO terminals and/or the protection component. For example, the protection component may prevent relatively high amplitude signals (e.g., voltage signals, current signals, and the like) from being provided to downstream components (e.g., an ADC and/or DAC) that may be damaged by the signals. As one example, protection circuitry may prevent an approximately 24 volt power signal from being provided to a ADC and/or DAC that is capable of processing voltage signals that have an amplitude of up to approximately 2.5 volts.

Each channel 102 of the IO system 100, in some embodiments, include interfaces to receive isolated power inputs from the controller 120. In some embodiments, each IO channel includes an isolated power supply or power source 420, such as a discrete power supply. The power supply may receive power from an external power source, and the power supply may provide power signals and/or reference signals to other components of the IO circuit 100.

Filtering components may be incorporated into the IO channel 102. The filtering component may facilitate the reduction of electrostatic discharge and/or electromagnetic interference within the IO circuit. Additionally, the filtering component may reduce aliasing within the IO circuit. A wide variety of filters may be utilized in various aspects of the disclosure, such as op amps that clamp the voltage levels that are provided to an ADC and/or DAC component and/or a low pass anti-aliasing filter (e.g., a low pass filter having a rating of approximately 200 Hz, and the like).

In another aspect, the IO input and output interfaces of the IO module 100 are configurable as a communication interface with a sensor device 104. In some embodiments, the communication interface is configured to communicate according to Highway Addressable Remote Transducer Protocol (HART).

Figure 5:
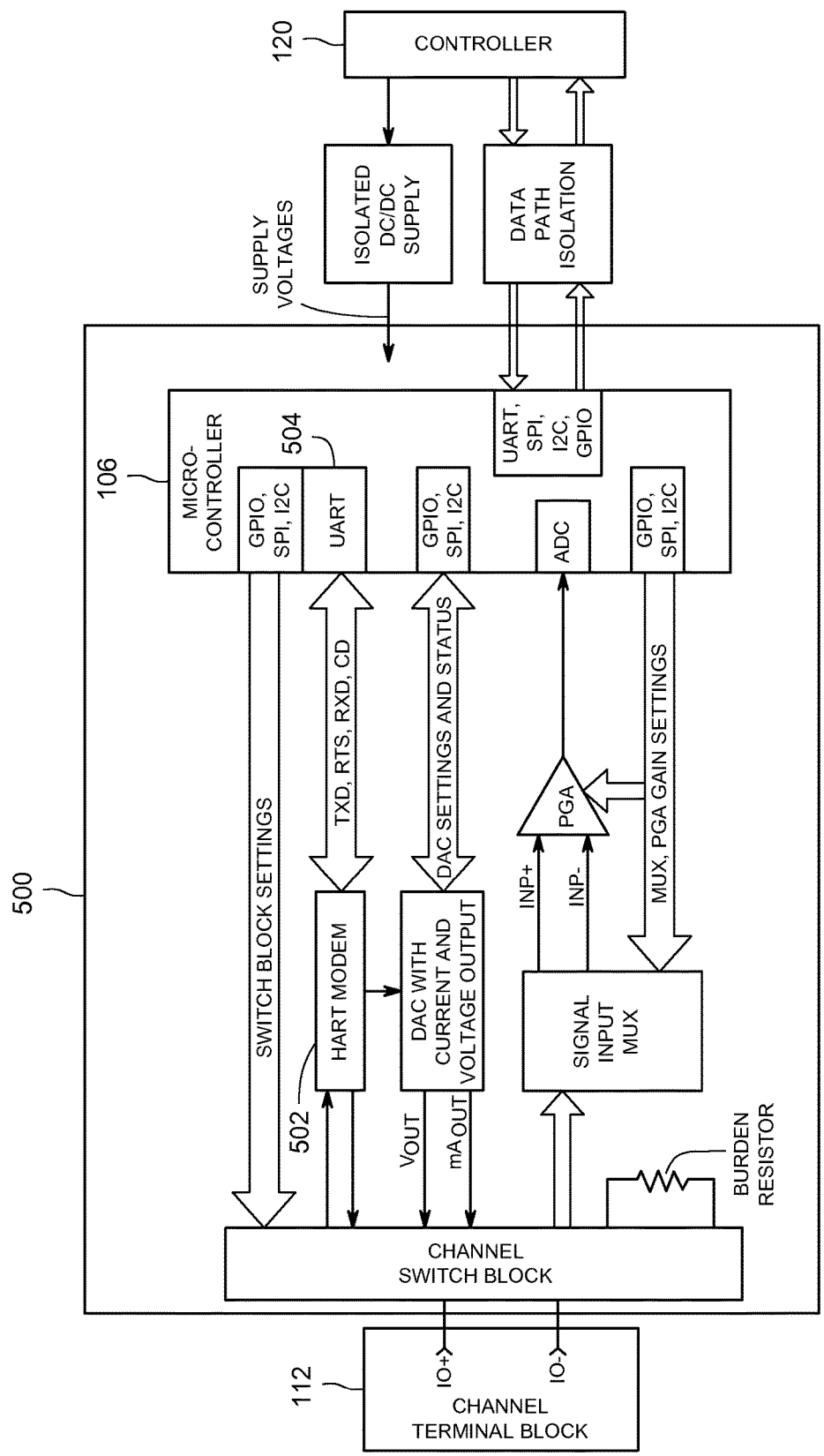
FIG. 5 depicts a block diagram of an IO channel of the universal module of FIG. 1, the IO module being configured to provide selectable and configurable analog input, analog output, digital input, digital output, and communication interface for a number of device types (e.g., a HART-compatible device) in accordance with an illustrative embodiment.

FIG. 5 depicts a block diagram of an IO channel 500 (previously referred to as 102) of the universal module of FIG. 1, the IO module 500 being configured to provide selectable and configurable analog input, analog output, digital input, digital output, and communication interface for a number of device types, e.g., a HART-compatible device, in accordance with an illustrative embodiment. In some embodiments, the IO channel is configured to be selectably configurable as a HART interface, as a RTD interface, a thermocouple interface.

As shown in FIG. 5, the IO channel 500 includes, in some embodiments, for each IO channel, a HART modem 502 that communicates via a respective UART port 504 of the microcontroller 106. When operating with the HART protocol, the IO channel 500 is configured to provide simultaneous communication channels over a 4-20 mA analog signal and a digital signal. In some embodiments, the 4-20 mA analog signal operates at a frequency between approximately 1200 hertz and 2200 hertz, and the digital UART signals may be superimposed, e.g., via Frequency Shift Keying, over the 4-20 mA signal.

In some embodiments, the IO channels 500 uses the same terminal pins at the terminal block 112 for the HART inputs as for the analog and digital input and output. In some embodiments, when connecting the IO channel with an external HART-compliant modem, the IO channel is configured to disable RTD and thermocouple inputs as well as voltage outputs.

In some embodiments, the IO channel 500 is programmably configurable to communicate as a master HART device or as a HART slave device. In some embodiments, the IO channel 102 is configurable as part of either a point-to-point communication system or a multi-drop communication system.

In some embodiments, the HART modem 502 includes discrete components, such as AD5070 or AD5070-1 modem devices, manufactured by Analog Device Inc., to communicate to peripheral ports 114 of each respective microcontroller 106 of a given IO channel 102.

Figure 6:
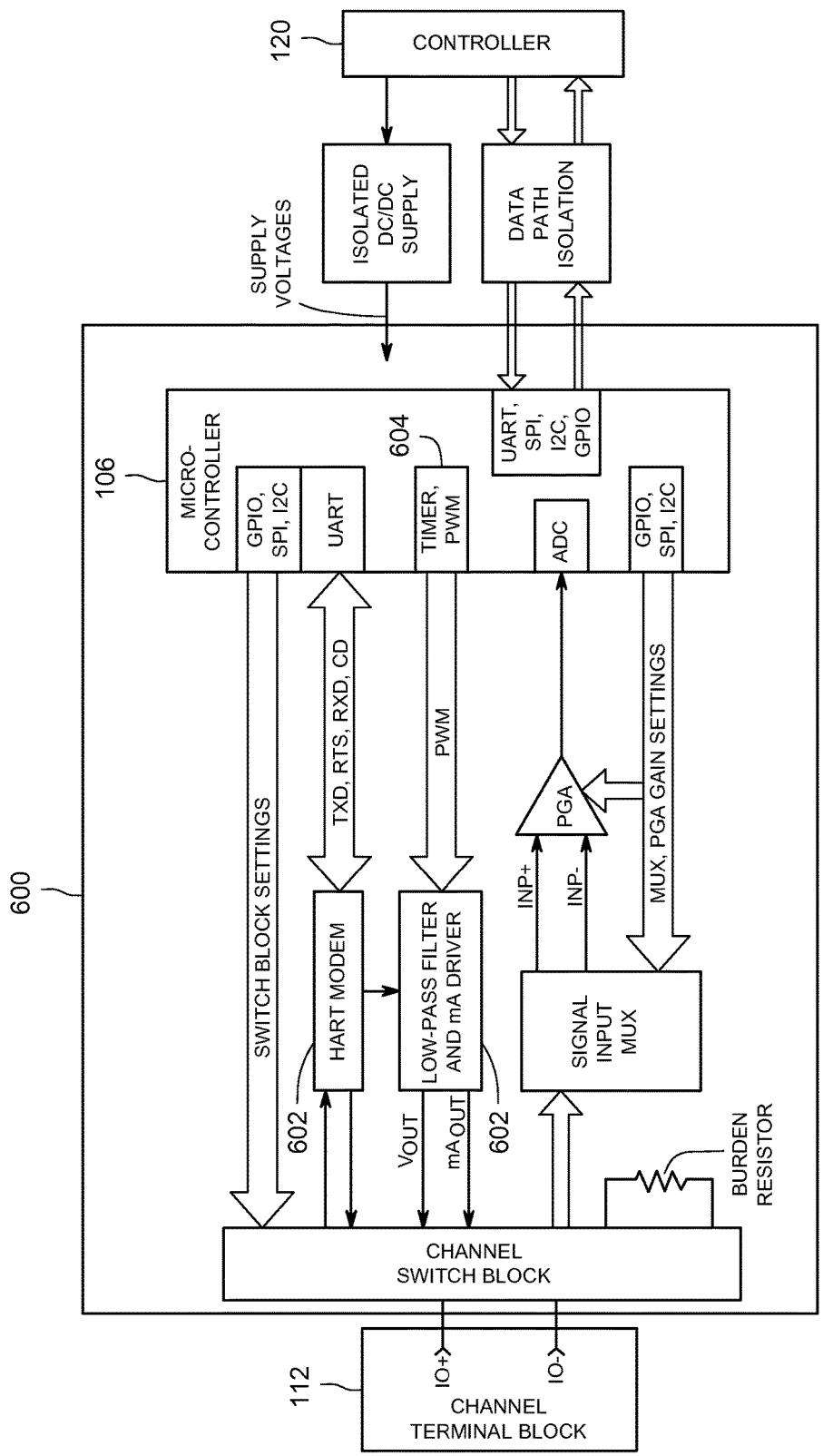
FIG. 6 depicts a block diagram of an IO channel of the universal module of FIG. 1, the IO module being configured to provide selectable and configurable analog input, analog output, digital input, digital output, and communication interface for a number of device types (e.g., a HART-compatible device) in accordance with another illustrative embodiment.

FIG. 6 depicts a block diagram of an IO channel 600 (previously referred to as 102) of the universal module of FIG. 1, the IO module 600 being configured to provide selectable and configurable analog input, analog output, digital input, digital output, and communication interface for a number of device types (e.g., a HART-compatible device) in accordance with another illustrative embodiment. The IO channel 600 includes a PWM module 602 to provide analog and digital output interfaces for the IO channel 600. As shown in FIG. 6, the PWM module 602 includes a pulse-width modulated (PWM) controlled low-pass filter and mA driver (e.g. current and/or voltage source). The PWM module 602 may replace, partially or wholly, the digital-to-analog circuit as described in relation to FIG. 4. The PWM module 602, in some embodiments, communicates with a timer port or a PWM port 604 of the microcontroller 106. In other embodiments, the PWM module 602 communicates with ports, of the microcontroller, that includes framing and duty-cycle timing logic.

Referring still to FIG. 6, the low pass filter pass band is set to preserve the desired output signal bandwidth while the filter order can be set to provide sufficient attenuation at the PWM clock rate. For example, an approximately 25-Hz signal bandwidth using an approximately 25 MHz clock on the PWM signal can be used in conjunction with a third-order filter, thereby dropping the clock below the noise floor of an approximately 16-bit conversion.

Figure 7:
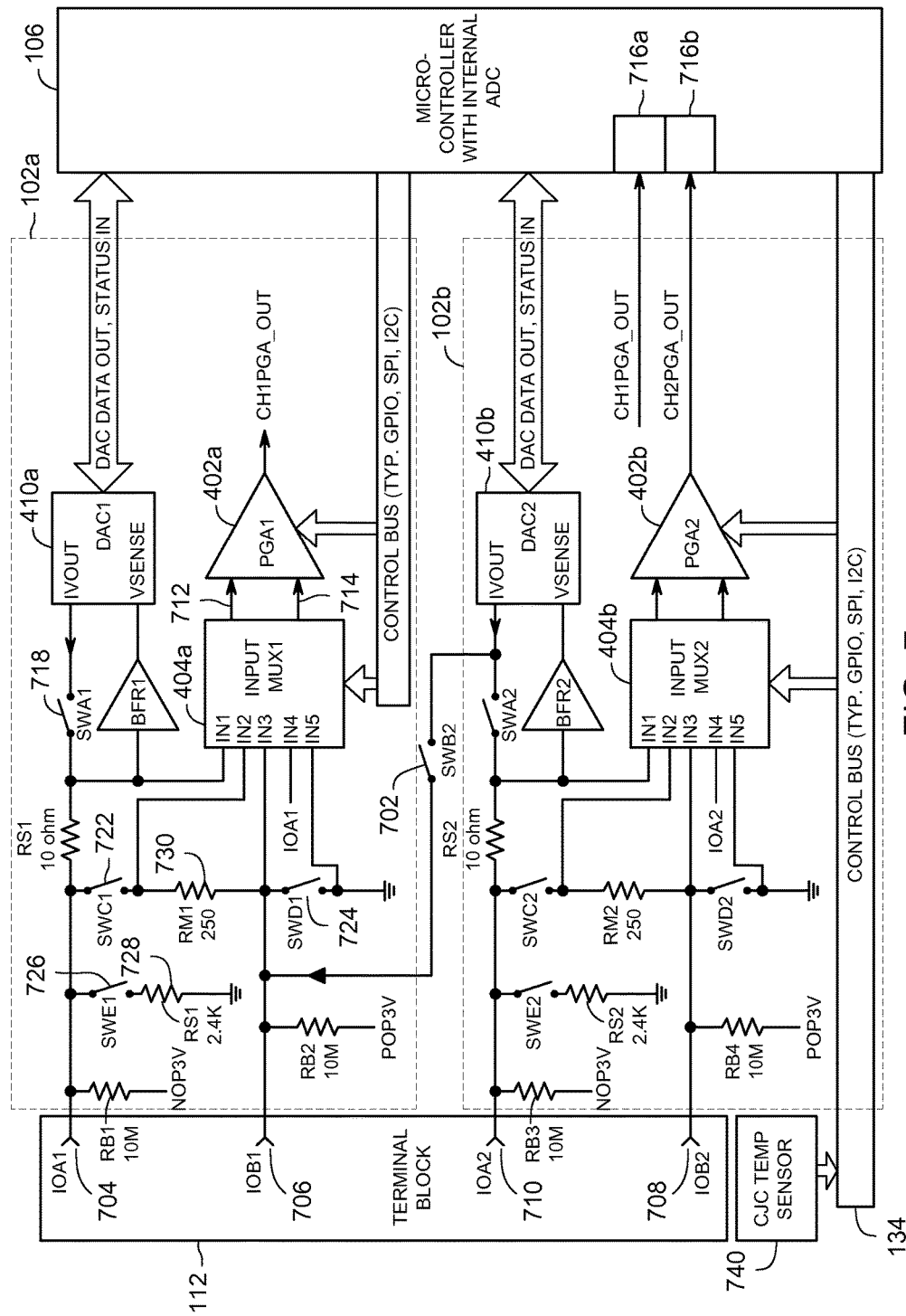
FIG. 7 depicts a detailed diagram of the universal IO module of FIG. 1, having two channels configurable to operate in a dual/multi-channel mode, in accordance with an illustrative embodiment.
Figure 8A:
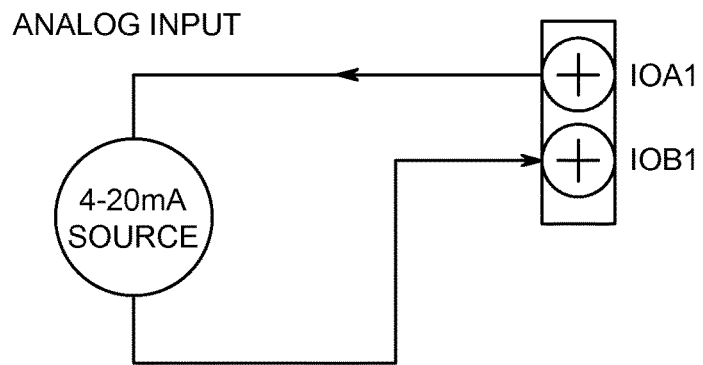
FIG. 8, comprising of FIGS. 8A. 8B, 8C, 8D, 8E, 8F, 8G, 8H, 8I, 8J, and 8K, depicts wiring diagrams to the IO module of FIG. 7 for various sensor types in accordance with an illustrative embodiment.
Figure 8B:
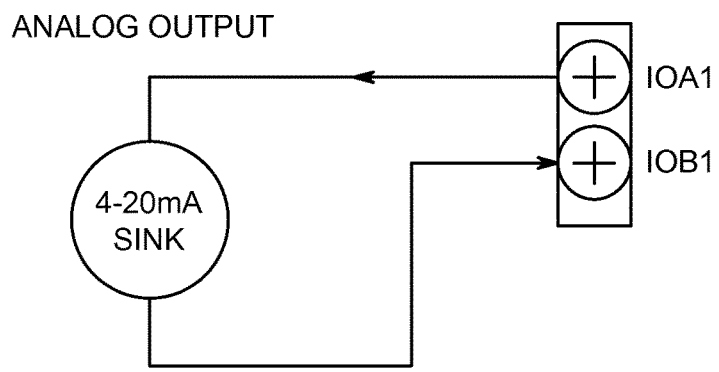
Figure 8C:
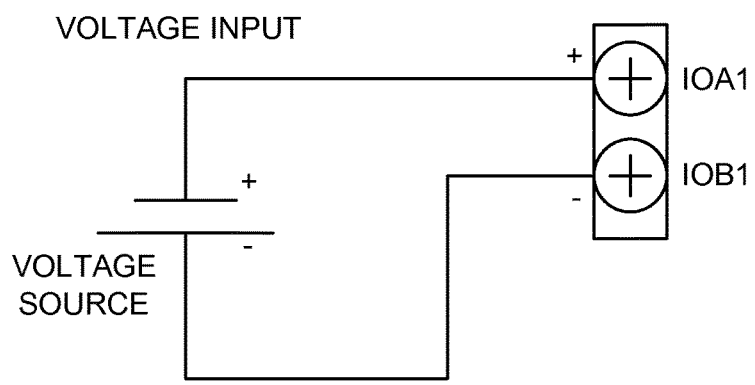
Figure 8D:
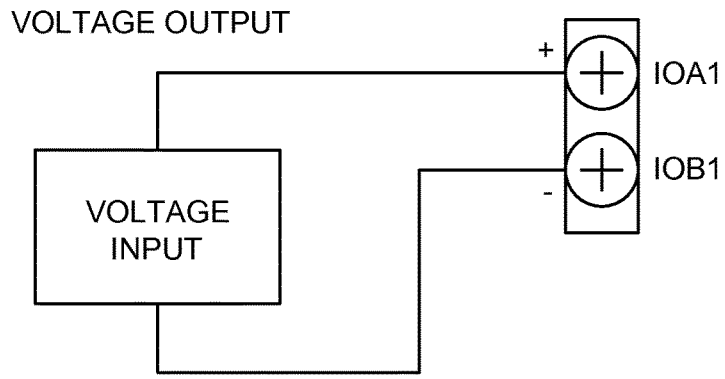
Figure 8E:
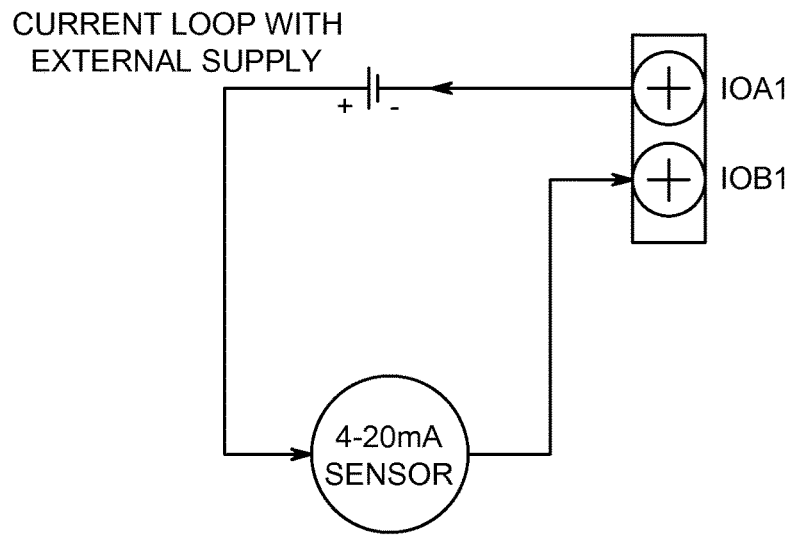
Figure 8F:
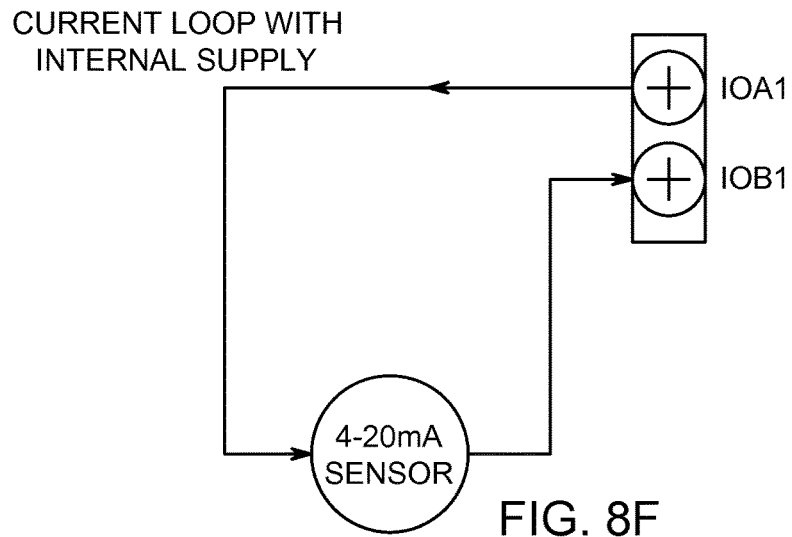
Figure 8G:
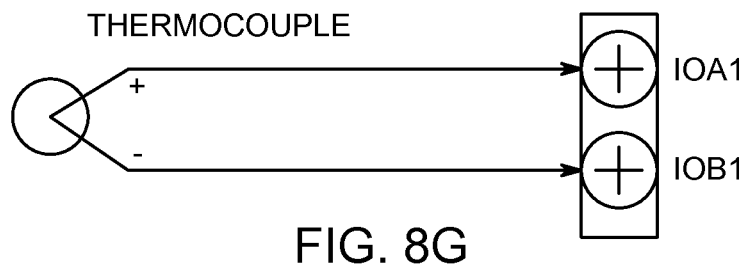
Figure 8H:
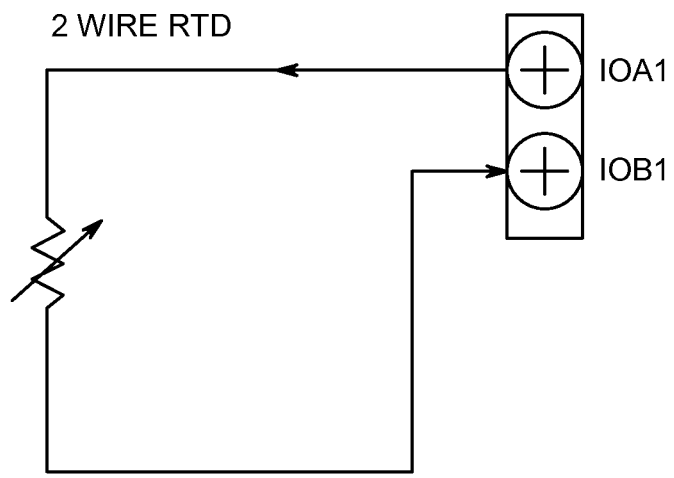
Figure 8I:
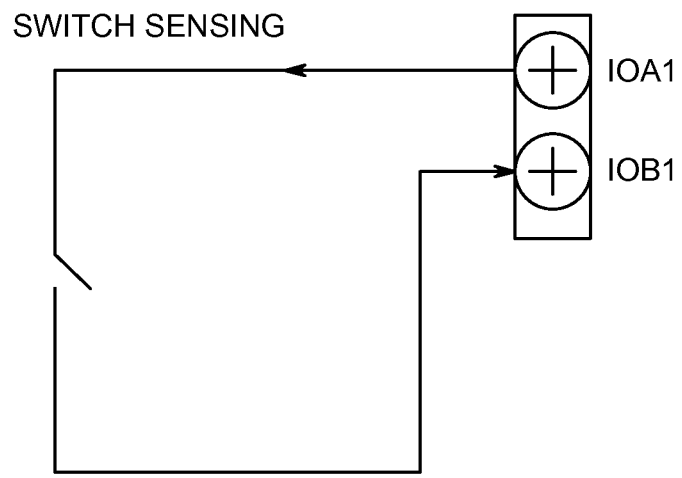
Figure 8J:
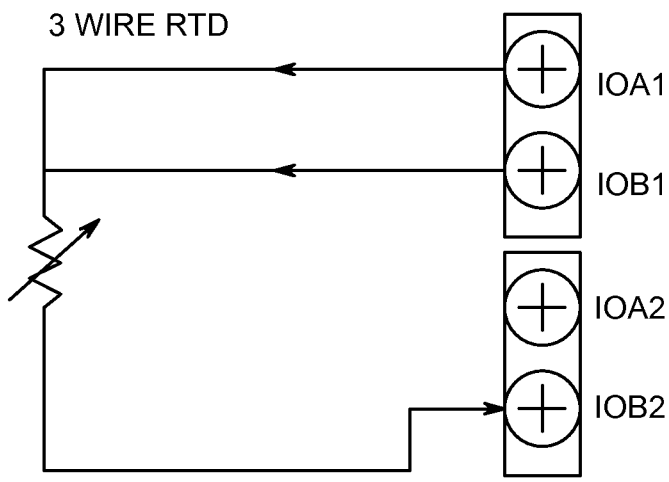
Figure 8K:
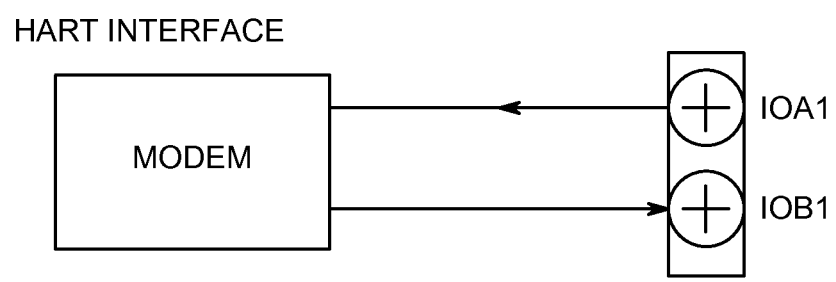

FIG. 7 depicts a detailed diagram of the universal IO module 100 of FIG. 1 in accordance with an illustrative embodiment. The diagram illustrates the internal structure of an exemplary channel switch block 108 in communication with two IO channels 102 (shown as 102a and 102b). The two IO channels 102a and 102b are configured to operate in dual/multi-channel mode as "sister" channels. That is, the two IO channels operate as a group to provide an interface to external devices that have more than two pins for its interface. In some embodiments, the use of two channels allows for the IO channel to operate as a 3-pin or 4-pin RTD interface. FIG. 8, comprising of FIGS. 8A, 8B, 8C, 8D, 8E, 8F, 8G, 8H, 8I, 8J, and 8K, depicts wiring diagrams to the two terminals of the IO module of FIG. 7 for various sensor types in accordance with an illustrative embodiment. The two terminal posts beneficially simplify wiring of sensor components to each respective IO channel.

Referring back to FIG. 7, the two IO channels 102a and 102b include a grouping switch 720 (shown as "SWB2 720"). The grouping switch 720 allows the DACs 410a and 410b to operate, for example, as RTD current source, with the SWB2 720 used to route the lower channel's DAC current to the upper channel's terminals. With this structure, the RTD 104 is configured to have identical currents flowing from IOA1 terminal 704 and IOB1 terminal 706 to each side of the RTD resistance with the sum of the currents flowing back on the third return wire to IOB2 708 to pass to ground.

Referring still to FIG. 7, the IO channel 102 further allows the RTD 104 to be separately wired, e.g., for diagnostic purposes. The IO channel 102 is configured to receive a return path tied to IOA2 (710) (rather than IOB2 708), allowing the lower channel (102b) to check that the return current is the sum of the sourced currents from DAC1 (410a) and DAC2 (410b). Where the return current does not match the summed current from the DACs, the IO channel 102 is configured to output a wiring fault status.

The pairs of channels 102a and 102b are duplicated, partially or wholly, in the circuitry. Each IO channel 102 includes the input multiplexer 404 (shown as 404a and 404b), which receives signals from the IO terminal block 112 to feed, as INP+ (712) and INP− (714), the programmable gate array 402 (shown respectively, as 402a and 402b). Each programmable gate array 402, in turn, feeds signals to an ADC input port 716 (shown as 716a and 716b) of each respective microcontroller 106. In some embodiments, the IO module 100 includes a single microcontroller 106 for each pair of IO channels 102. In some embodiments, the IO module 100 includes a single microcontroller 106 for two pairs of IO channels 102.

Referring now to the switches in the IO switching unit 108 in FIG. 7, each IO switching unit includes, in some embodiments, switches SWA (718) (shown as "SWA1" and "SWA2", respectively), SWB (720), SWC (722) (shown as "SWC1" and "SWC2", respectively), SWD (724) (shown as "SWD1" and "SWD2", respectively), and SWE (726) (shown as "SWE1" and "SWE2", respectively). Each channel DAC has a buffer for voltage output sensing and an output enable switch (SWA1, SWA2). DAC2 further has SWB2 for passing the current output to the sister channel.

Table 2 illustrates exemplary switch and PGA settings for the various modes of operations of the IO channel.

the voltage sensed at IOA1 (704) with respect to ground. The ground return is supplied by IOB1 (706) with SWD1 (724) closed for the ground path. In a similar manner, contact inputs are sensed for channel 102b—either with a current supplied to the switch via IOA2 by DAC2 returning on IOB2

TABLE 2

IO Switching Unit Configuration for each Mode of Operations of the IO Channel

| Channel | MODE | DAC | SWA | SWB | SWC | SWD | HVM |
|---|---|---|---|---|---|---|---|
| Either | Externally powered Switch into IOA, ground return at IOB | disable | open | open | closed | closed | disable |
| Either | Internally powered switch from IOA to IOB | 10 mA | closed | open | open | closed | disable |
| Either | floating mA Input, allow reversed wiring | disable | open | open | closed | open | disable |
| Either | mA Input to GND, allow reversed wiring, HART | disable | open | open | closed | closed | enable when RTS |
| Either | mA Output, HART optional | 0 to 24 mA source | closed | open | open | closed | enable via DAC control |
| Either | Thermocouple | disable | open | open | open | open | disable |
| Either | Single ended Volt Input | disable | open | open | open | closed | disable |
| Either | Differential Volt Input | disable | open | open | open | open | disable |
| Either | Volt Output | +/−11 Volts Out | closed | open | open | closed | disable |
| 1 | RTD #1 Volts | 1 mA source | closed | n/a | open | open | disable |
| 2 | RTD #2 mA return, shared GND path | 1 mA source | open | closed | closed | closed | disable |
| 2 | RTD #2 mA return sensing | 1 mA source | open | closed | closed | closed | disable |
| Either | Check for SWD | n/a | open | open | open | open | disable |

| Channel | MODE | MUX Path | PGA + Input | PGA − Input | PGA operating input span | Net gain for +/−2 V span |
|---|---|---|---|---|---|---|
| Either | Externally powered Switch into IOA, ground return at IOB | 1 | IN4 | IN3 | up to 24 V | 0.0625 |
| Either | Internally powered switch from IOA to IOB | 1 | IN4 | IN3 | up to 24 V | 0.0625 |
| Either | floating mA Input, allow reversed wiring | 2 | IN2 | IN3 | +/−6.25 V in | 0.25 |
| Either | mA Input to GND, allow reversed wiring, HART | 2 | IN2 | IN3 | +/−6.25 V in | 0.25 |
| Either | mA Output, HART optional | 3 | IN1 | IN4 | 0 to 240 mV in with up to 24 V CMV | 8 |
| Either | Thermocouple | 1 | IN4 | IN3 | −40 to 130 mV in | 16 |
| Either | Single ended Volt Input | 1 | IN4 | IN3 | +/−11 V in | 0.125 |
| Either | Differential Volt Input | 1 | IN4 | IN3 | +/−11 V in | 0.125 |
| Either | Volt Output | 1 | IN4 | IN3 | +/−11 V in | 0.125 |
| 1 | RTD #1 Volts | 1 | IN4 | IN3 | 0 to 4 V in | 0.5 |
| 2 | RTD #2 mA return, shared GND path | x | don't care | don't care | don't care | don't care |
| 2 | RTD #2 mA return sensing | 2 | IN2 | IN3 | 0.5 V in | 4 |
| Either | Check for SWD | 4 | IN3 | IN5 | −11 to 28 V survive, ok if under +/−0.5 V | 4 |

As shown in FIG. 7 and Table 2, current output sensing for channel 102a is provided by RS1 (728), through SWE1 (726), for the DAC output when flowing to terminal IOA1 (704). Current output sensing for channel 102b is provided by RS2, through SWE2, for the DAC output when flowing to terminal IOA2.

Referring still to FIG. 7 and Table 2, current input sensing is provided by a switched resistor, RM1 (730) and SWC1 (722). Current input sensing is provided by a switched resistor, RM2 and SWC2.

Referring still to FIG. 7 and Table 2, contact inputs are sensed in two ways for channel 102a—either i) with a current supplied to the switch (i.e., the external switch) via IOA1 (704) by DAC1 (410a) returning on IOB1 (706) to ground via SWD1 (724) where the switch voltage is sensed across IOA1 (704) to IOB1 (706), or ii) from an externally powered switch to IOA1 (704) with loading supplied by a switched resistor RS1 (728) to ground and SWE1 (726) with to ground via SWD2 where the switch voltage is sensed across IOA2 to IOB2, or from an externally powered switch to IOA2 with loading supplied by a switched resistor to ground RS2 and SWE2 with the voltage sensed at IOA2 with respect to ground. The ground return is supplied by IOB2 with SWD2 closed for the ground path.

Referring still to FIG. 7 and Table 2, to provide voltage inputs for IO channel 102a, the switch block switches (718, 720, 722, 724, 726) are opened with the MUX (404a) connecting the PGA (402a) across the two terminals (704 and 706).

Referring still to FIG. 7 and Table 2, to provide the thermocouple interface, the IO channels 102a, 102b include weak pull up and pull down resistors RB1 (732), RB2 (734), RB3 (736), and RB4 (738) for burnout detection. To prevent current errors on the thermocouple measurement, the resistors (RB1 and RB2 for IO channel 102a, and RB3 and RB4 for IO channel 102b) are size at around 10MΩ to provide an open connection forced to −0.6 volts, which is outside the operating range of standard thermocouples. When a thermocouple device is connected, the resulting voltage drop across the thermocouple is on the order of a microvolt, well within the error budget. To support thermocouple operations, a temperature sensor 740 is provided at the terminal block. The temperature sensor 740 may either be analog based, e.g., using an additional ADC input of the IO peripheral 114 of the microcontroller 106 or digital based, e.g., using a serial interface to a GPIO, SPI, or I2C port of the microcontroller 106. The temperature sensor 106 may report temperature readings periodically in response to commands from the microcontroller 106.

For the IO channel to operate at a wide range of operating voltages, which may be observed at the multiplexer, in some embodiments, switches 718-726 are rated for operation at least between about −12 volt to +24 volt, or wider, with the series resistance of the switches being on the order of hundreds of ohms. In some embodiments, the input multiplexer 404*a* is a MUX SPDT, such as the MAX14753 (2 of 4:1 MUX) or the MAX14757 (quad SPST), manufactured by Maxim, Inc.

Figure 9:
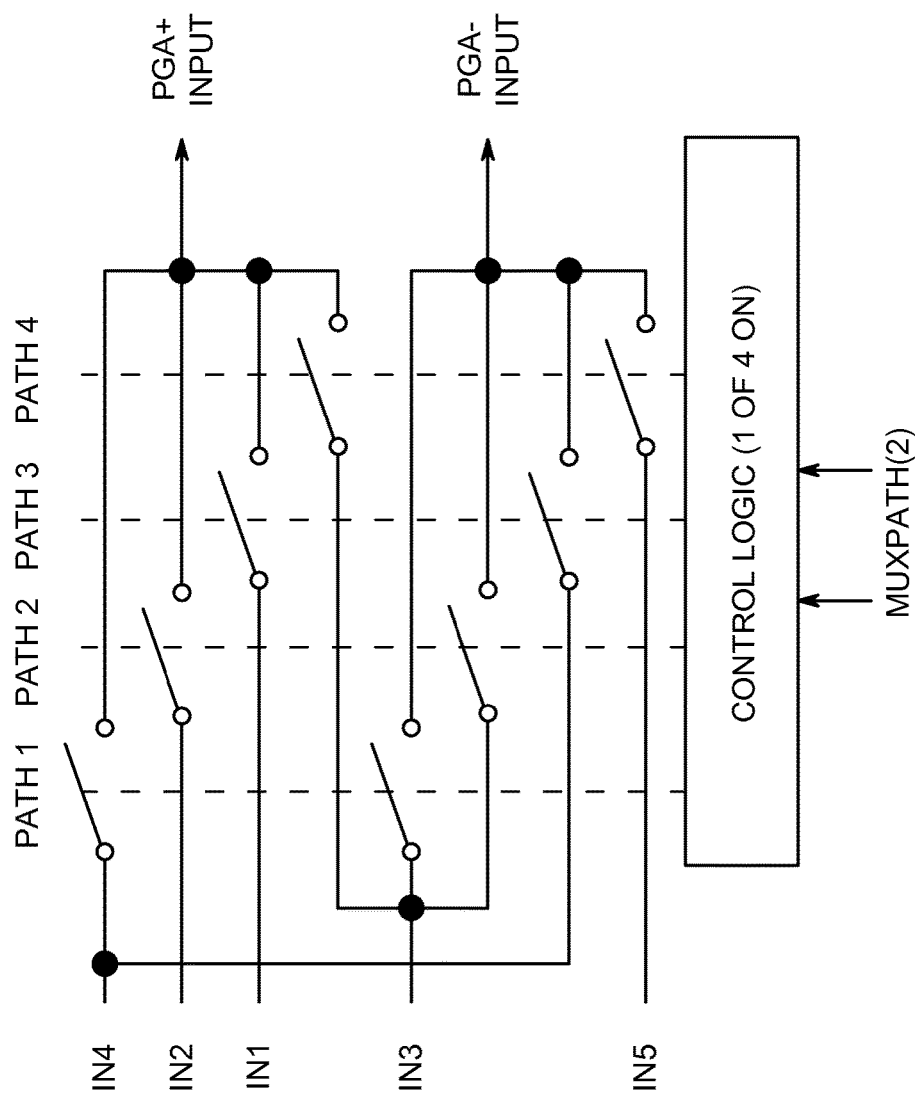
FIG. 9 depicts a detailed diagram of the IO switch block of FIG. 1 in accordance with an illustrative embodiment.

In some embodiments, the input multiplexer 404*a* and 404*b* are combined and/or integrated with the respective programmable gate array 402*a*, 402*b*. FIG. 9 depicts a diagram of an exemplary multiplexer 404 in accordance with an illustrative embodiment.

Referring back to FIG. 7, each programmable gate array 402*a*, 402*b* is configured to enable a wide range of gains (e.g., 1/16 to 128) that are set at configuration and left stable. The programmable gate array is configured, in some embodiments, to enable w for either input, at the terminals, to see between the minimum (−11V) and maximum (+26.4V) input span. An example of the programmable gate array is the PGA280, manufactured by Texas Instruments, Inc. In some embodiments, the programmable gate array communicates with the SPI port of the microcontroller 106 and is configured to provide internal gains for dual differential inputs. In some embodiments, an attenuator is included between the MUX outputs and amplifier front stage.

Figure 10A:
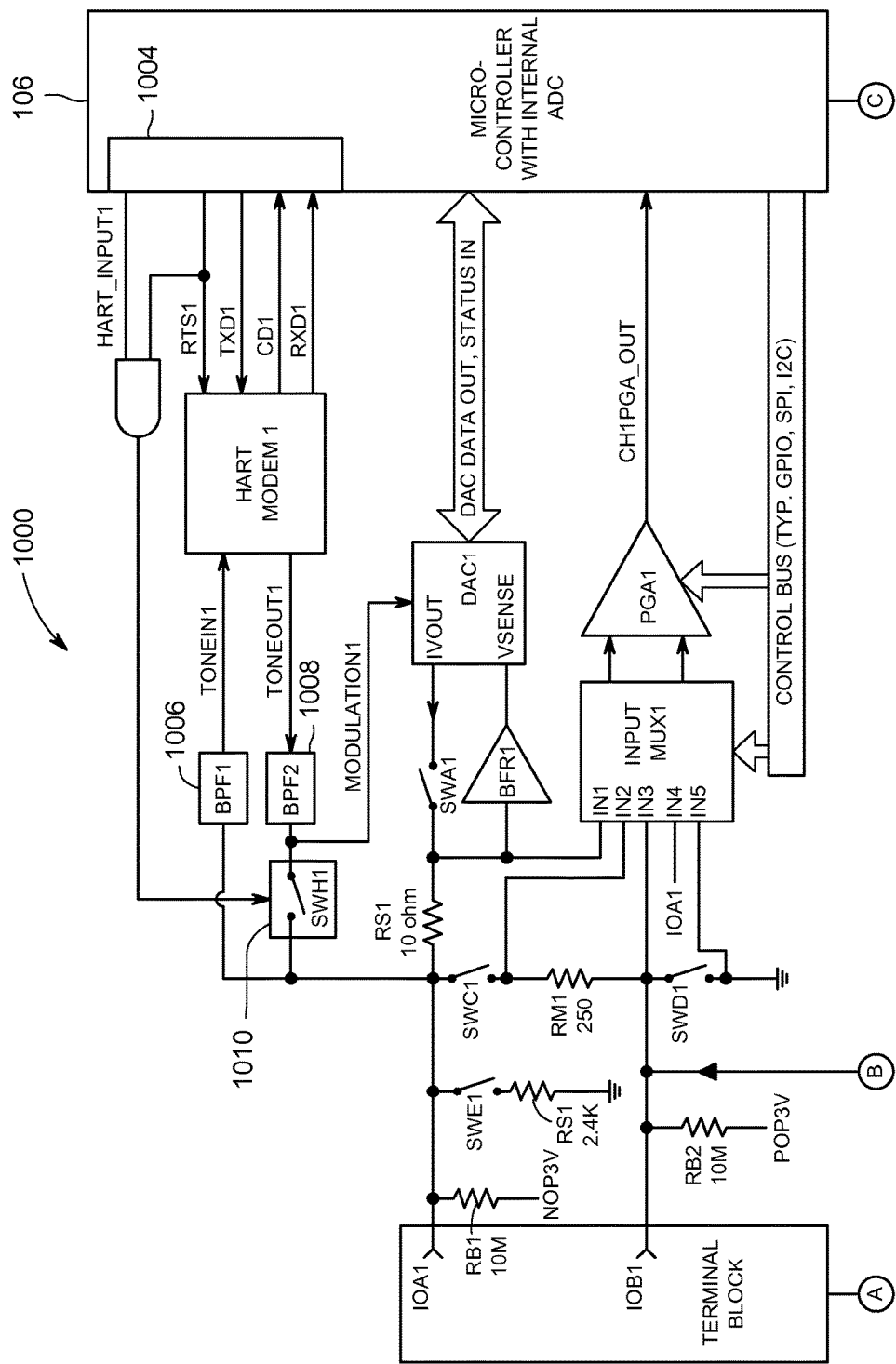
FIG. 10, comprising 10A and 10B, depicts a detailed diagram of the universal IO module of FIG. 1, the IO module being configured to provide selectable and configurable analog input, analog output, digital input, digital output, and communication interface for a number of device types (e.g., a HART-compatible device) in accordance with another illustrative embodiment.
Figure 10B:
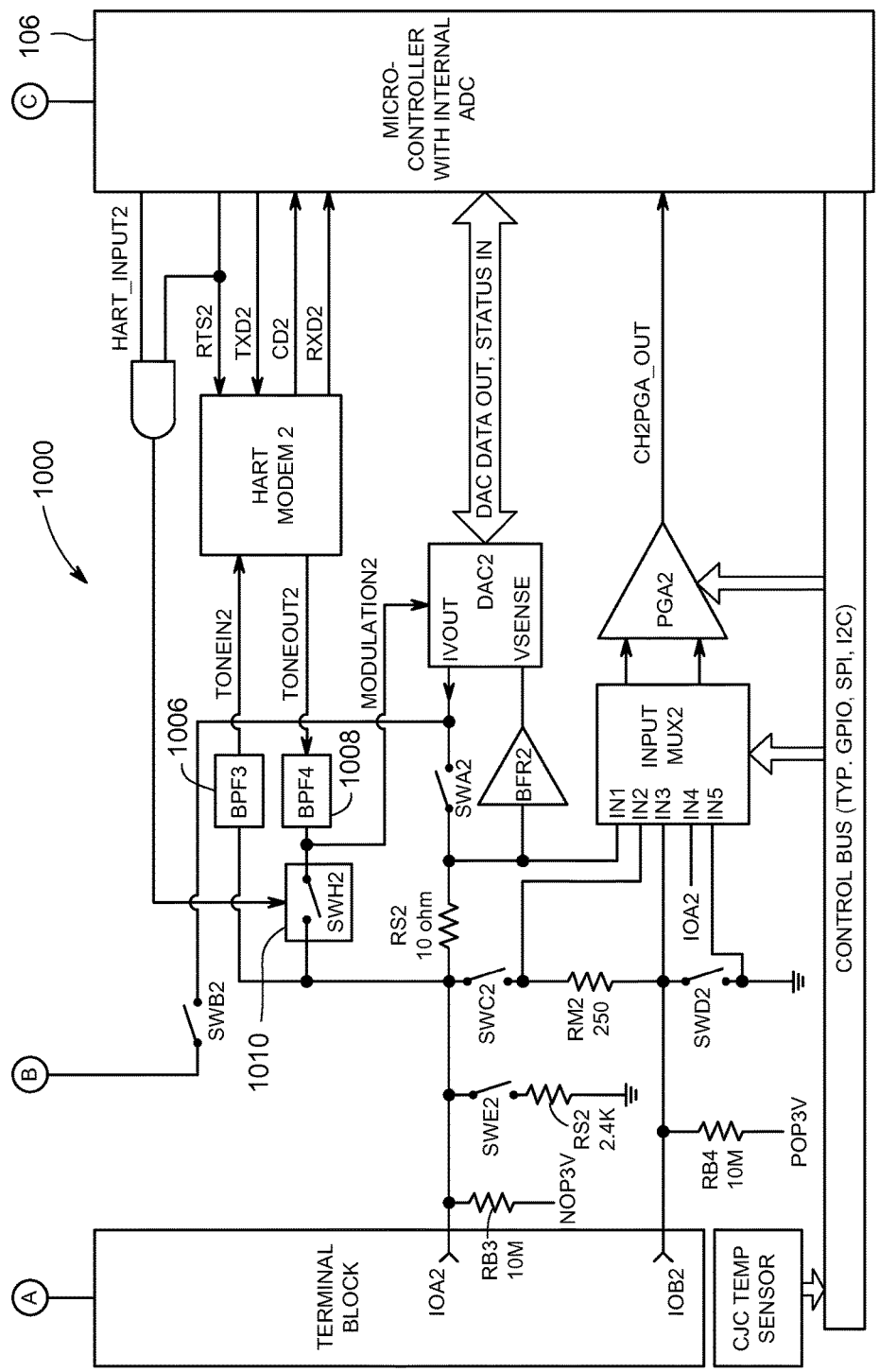

FIG. 10 depicts a detailed diagram of the universal IO module 1000 of FIG. 1, the IO module 1000 being configured to provide selectable and configurable analog input, analog output, digital input, digital output, and communication interface for a number of device types (e.g., a HART-compatible device) in accordance with another illustrative embodiment.

The IO module 1000 include a HART modem 1002 that interfaces to a UART port 1004 of the microcontroller 106. The IO module 1000 may include bandpass filters 1006 to block DC levels from the demodulator input to the HART modem 1002 while allowing the tone signals to pass. The IO module 1000 may include a second bandpass filter 1008 to allow digitized modulator signal to reduce harmonics prior to either modulating the DAC current (HART output mode) or the voltage at the burden resistor (HART input mode). The IO module 1000 may include a switch 1010 (shown as "SWH1" and "SWH2") to control the HART modulator output path. As shown in FIG. 10, the switch SWH1 (1010) is closed, in some embodiments, only on HART input mode when the modem is transmitting. Example HART modem that may be used includes, but not limited to, series of AD5700, manufactured by Analog Devices, Inc. Examples of HART modem implementation is described in Analog Devices reference Circuit Note 0328, the text of which is incorporated by reference herein in its entirety.

Figure 11:
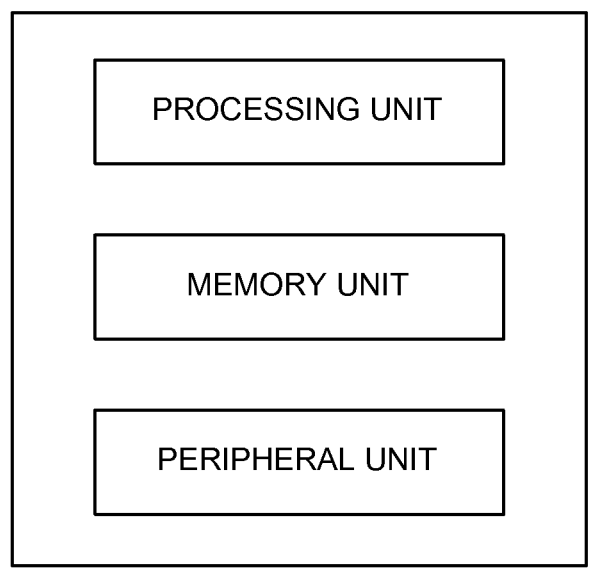
FIG. 11 depicts a diagram of an illustrative embodiment of a microcontroller or microcontroller core in accordance with an illustrative embodiment.

FIG. 11 depicts a diagram of an illustrative embodiment of a microcontroller or microcontroller core. The microcontroller or microcontroller core can include a processor unit, a memory unit, and an input-output peripheral unit, collectively integrated on a single die. Example microcontrollers that can be used in accordance with the disclosure includes, for example, but not be limited to microcontrollers produced by Texas Instruments, Kinetis, Maxim, and Analog Devices. For example, Texas Instrument microcontroller MSP430i2041 may be used which has a quad-sigma-delta 24-bit analog and digital (A/D) inputs. As another example, Texas Instrument microcontroller MSP430F6736 may be used which has triple sigma-delta 24-bit A/D inputs. In yet another example, Analog Devices microcontrollers ADuC7060 and ADuM360 may be used, which each has dual sigma-delta A/D inputs. As yet another example, Kinetis microcontroller MKM14Z128ACHH may be used which has a four sigma-delta 24-bit ADC and PGA. In yet another example, Maxim microcontroller MAX32600 may be used which has 16 ADC and mux for up to 8 of differential inputs. Other microcontrollers may be used in conjunction with one or more external ADCs. Example ADCs may include, but are not limited to, Texas Instruments ADS131E08 octal-sigma-delta converter which allows a microcontroller to handle up to 8 channels.

Figure 12:
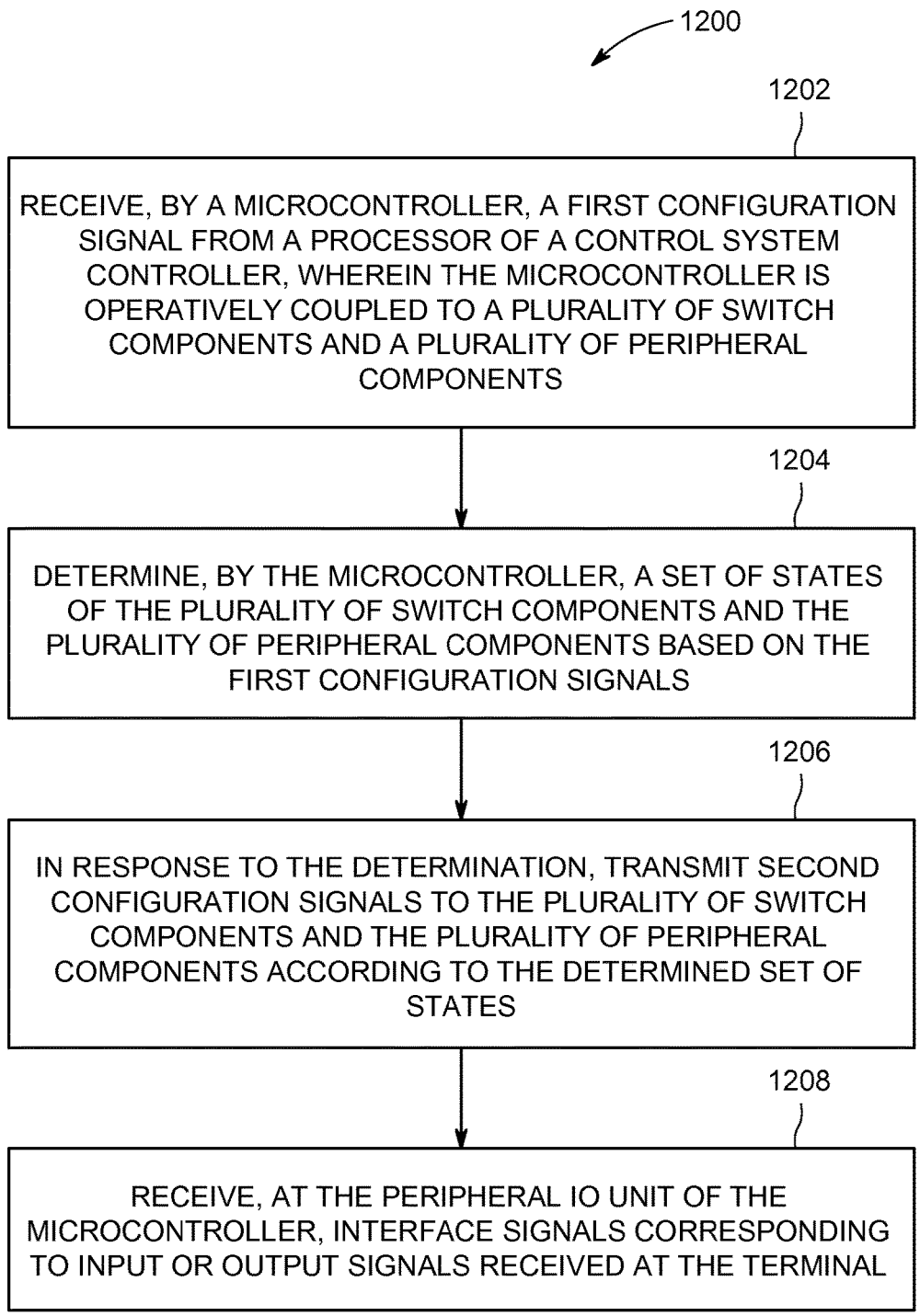
FIG. 12 depicts a block diagram illustrating a method of interfacing to a plurality of device types in accordance with an illustrative embodiment.

FIG. 12 depicts a block diagram illustrating a method 1200 of interfacing to a plurality of device types in accordance with an illustrative embodiment. The method 1200 includes receiving, by a microcontroller 106, a first configuration signal from a processor 120 of a control system controller, where the microcontroller 106 is operatively coupled to a plurality of switch components and a plurality of peripheral components (step 1202). Each of the switch components (e.g., of IO switching unit 108) and peripheral components (e.g., input and output conditioning circuits 118, 126) includes a plurality of states. In some embodiments, the first configuration signal includes state information (e.g., open or close or settings) associated with the switch components and the peripheral components. The switches and peripheral components form one of a plurality of signal paths between a terminal and a peripheral IO unit of the microcontroller, wherein each signal path is associated with a sensor type mode.

The method 1200 further includes determining, by the microcontroller 106, a set of states of the plurality of switch components and the plurality of peripheral components based on the first configuration signals (step 1204). In some embodiments, the microcontroller 106 includes a look-up-table of states of the switches and peripheral components associated with a given operation mode. In other embodiments, the microcontroller 106 is configured to parse a serial signal from the processor 120, which includes state information for the switches and peripheral components.

The method 1200 further includes, in response to the determination, transmitting second configuration signals to the plurality of switch components and the plurality of peripheral components according to the determined set of states (step 1106). The configuration signals may be transmitted through the control bus, via the general purpose IO, SPI or I2C port 114, of the microcontroller 106.

The method 1200 further includes, receiving, along the signal path, at the peripheral IO unit of the microcontroller, interface signals corresponding to input or output signals received at the terminal (step 1208).

The present disclosure may employ various input and output interface disclosed in the following, each of which is incorporated by reference herein in its entirety, including:

U.S. Pat. No. 8,924,600, U.S. Pat. No. 8,373,586, U.S. Pat. No. 7,912,562, U.S. Pat. No. 4,910,659, US20150045936, US20140239923, and US20140047137.

In some embodiments, the IO module 100 includes a base board to receive up to a pre-defined number of IO channels, for example, 1, 2, 3, 4, 5, 6, 7, 8, 9, 10, 11, 12, 13, 14, 15, 16, 17, 18, 19, and 20. In some embodiments, the base of the IO module 100 may receive more than 20 channels. The IO module is configurable to disable any unused IO-channel slots in the base board. The IO channels may be organized into groups or sets. For example, sixteen IO channels may be provided, and the channels may be divided into eight groups of two IO channels, four groups of four IO channels, or other groups. In some embodiments, the grouping are configurable whereby a given IO channel is grouped to a nearby IO channel.

In some embodiments, the system 100 is implementable as a universal IO module for use in, or with, a Mark VIe Integrated Control System (ICS), manufactured by the General Electric Co. In other embodiments, the system 100 is implementable as a universal IO module for use in programmable logic controller, such as the Rx3i PLC product line, manufactured by the General Electric Co.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

Various embodiments of the disclosure may include one or more special purpose computers, systems, and/or particular machines that facilitate the receipt, processing, and/or output of analog and/or digital data. A special purpose computer or particular machine may include a wide variety of different software modules and/or computer-implemented or computer-executable instructions in various aspects. As explained in greater detail below, in certain aspects, these various software components may be utilized to facilitate the operation of an IO circuit and/or the processing of received analog or digital data.

Certain aspects of the disclosure described herein may have the technical effect of facilitating receipt or transmission of different types of analog or digital IO by a universal IO circuit. Additionally, certain aspects of the disclosure may have the technical effect of facilitating the processing, input, and/or output of one or more received or transmitted IO signals. In this regard, a flexible analog or digital IO circuit may be provided and unused analog or digital IO channels may be reduced or avoided.

What is claimed is:

1. A system comprising:
a processor;
a plurality of configurable input-output (IO) channels operatively coupled to the processor to provide analog and digital interfaces to a plurality of device types, the analog and digital interfaces being configurable as a digital input, a digital output, an analog input, and an analog output based on control signals outputted between the processor and a given configurable IO channel, wherein the plurality of device types include a first device type and a second device type, wherein the first device type is different from the second device type, and
wherein each configurable JO channel of the plurality of configurable IO channels comprises a microcontroller operatively coupled to an IO switching unit, wherein the IO switching unit is configurable to direct IO signals from one or more terminals of the configurable IO channel to an IO peripheral unit of the microcontroller; and
two terminal posts, wherein each terminal post is configured to provide a discrete electrical connection to a connected device of the plurality of device types.

2. The system of claim 1, wherein the microcontroller is fabricated on a first die, and the IO switching unit is fabricated on a second die, wherein the first die is different from the second die.

3. The system of claim 1, wherein the microcontroller comprises an integrated circuit having a processor unit, a memory unit, and the IO peripheral unit, collectively integrated on either a single die or within a core embedded within a field programmable gate array (FPGA) or an application-specific integrated circuit (ASIC).

4. The system of claim 1, wherein the system is configured as an IO module for use in an industrial control system and connectable to a programmable logic controller (PLC).

5. The system of claim 1, wherein the microcontroller comprises a general-purpose microcontroller.

6. The system of claim 1, wherein the IO switching unit is configurable to direct JO signals from one or more terminals of each configurable IO channel to an IO peripheral unit of the microcontroller.

7. The system of claim 1, wherein the IO switching unit is configurable to direct IO signals from one or more terminals of each configurable IO channel to a resistive network, wherein the resistive network has a plurality of states, each state being selectable by the IO switching unit.

8. The system of claim 1, wherein the IO switching unit is configured to direct IO signals to one or more JO ports of the IO peripheral unit of the microcontroller, wherein said IO ports are selected from the group consisting of a general-purpose IO, a Universal Asynchronous Receiver/Transmitter (UART) interface, a Serial Peripheral Interface (SPI) bus interface, an Inter-Integrated Circuit (I2C) bus interface, and a Controller Area Network (CAN) bus interface.

9. The system of claim 1, wherein the plurality of configurable IO channels are partitioned into one or more IO groups, including a first IO group and a second IO group, the first JO group being electrically isolated from the second JO group.

10. The system of claim 9, wherein at least one of the one or more IO groups comprises a pair of configurable JO channels.

11. The system of claim 10, wherein the pair of configurable IO channels comprises a first IO channel and a second channel, the pair of configurable JO channels comprising a pairing switch unit coupled between the first JO channel and the second JO channel, wherein the paired configurable JO channels are configurable to simultaneously connect to a device.

12. The system of claim 1, comprising an output conditioning circuit, wherein the output conditioning circuit comprises a digital-to-analog converter (DAC) circuit coupled to a digital output JO port of the IO peripheral unit of the microcontroller, wherein the digital output IO port includes a type selected from the group consisting of a general-purpose IO, a Universal Asynchronous Receiver/Transmitter (UART) interface, a Serial Peripheral Interface (SPI) bus interface, an Inter-Integrated Circuit (I2C) bus interface, and a Controller Area Network (CAN) bus interface.

13. The system of claim 1, comprising an analog and digital input conditioning circuit, wherein the analog and digital input conditioning circuit comprises a programmable gain amplifier (PGA) circuit having a plurality of configuration states, wherein each state is selectable based on control signals associated with a digital input IO port of the IO peripheral unit of the microcontroller, and wherein the digital input IO port includes a type selected from the group consisting of a general-purpose IO, a Universal Asynchronous Receiver/Transmitter (UART) interface, a Serial Peripheral Interface (SPI) bus interface, an Inter-Integrated Circuit (I2C) bus interface, and a Controller Area Network (CAN) bus interface.

14. The system of claim 1, comprising an analog and digital input conditioning circuit, wherein the analog and digital input conditioning circuit comprises a programmable gain amplifier (PGA) circuit, wherein the programmable gain amplifier circuit is operatively coupled to an analog input IO port of the IO peripheral unit of the microcontroller.

15. The system of claim 1, comprising an analog and digital output conditioning circuit, wherein the analog and digital output conditioning circuit comprises a programmable gain amplifier (PGA) circuit, wherein the programmable gain amplifier circuit is operatively coupled to an analog output IO port of the IO peripheral unit of the microcontroller.

16. The system of claim 1, wherein each configurable 10 channel of the plurality of configurable IO channels comprises a modem device interface.

17. The system of claim 1, wherein each configurable IO channel of the plurality of configurable IO channels comprises an output conditioning circuit, wherein the output conditioning circuit comprises a low-pass filter circuit and a current driver, collectively, coupled to a digital output IO port of the IO peripheral unit of the microcontroller, wherein the digital output IO port includes a type selected from the group consisting of a timer IO and a pulse-width modulation (PWM) IO.

18. A universal IO channel configurable to provide analog and digital interfaces to a plurality of device types, wherein the analog and digital interfaces are configurable as either a digital input, a digital output, an analog input, or an analog output, wherein the plurality of device types include a first device type and a second device type, and wherein the first device type is different from the second device type, the universal IO channel comprising:
    a microcontroller comprising an integrated circuit having a processor unit, a memory unit, and a programmable IO peripheral unit, collectively integrated on a single die;
    an IO switching unit operatively coupled to the microcontroller, wherein the IO switching unit is configurable to direct IO signals from one or more terminals of the configurable IO channel to the IO peripheral unit of the microcontroller, wherein the IO switching unit is fabricated on a second die, and wherein the first die is different from the second die; and
    two terminal posts, wherein each terminal post is configured to provide a discrete electrical connection to a connected device of the plurality of device types.

19. A method for interfacing to a plurality of device types, including a first device type and a second device type, wherein the first device type is different from the second device type, the method comprising:
    receiving, by a microcontroller, a first configuration signal from a processor of a control system controller, wherein the microcontroller is operatively coupled to a plurality of switch components and a plurality of peripheral components, wherein each of the switch and peripheral components has a plurality of states, and wherein the switches and peripheral components form one of a plurality of signal paths between a terminal and a peripheral IO unit of the microcontroller, and wherein each signal path is associated with a sensor type mode;
    determining, by the microcontroller, a set of states of the plurality of switch components and the plurality of peripheral components based on at least the first configuration signal;
    in response to the determination, transmitting second configuration signals to the plurality of switch components and the plurality of peripheral components according to the determined set of states;
    providing, through two terminal posts, a discrete electrical connection to a connected device of the plurality of device types; and
    receiving, along the corresponding signal path, at the peripheral IO unit of the microcontroller, interface signals corresponding to input or output signals received at the terminal.

* * * * *